(12) United States Patent
Fortusini et al.

(10) Patent No.: US 9,069,142 B2
(45) Date of Patent: Jun. 30, 2015

(54) SMALL-FORM-FACTOR FIBER OPTIC INTERFACE DEVICES WITH AN INTERNAL LENS

(75) Inventors: Davide Domenico Fortusini, Ithaca, NY (US); Micah Colen Isenhour, Lincolnton, NC (US); Dennis Michael Knecht, Hickory, NC (US); James Phillip Luther, Hickory, NC (US)

(73) Assignee: CORNING INCORPORATED, Corning, NY (US)

( * ) Notice: Subject to any disclaimer, the term of this patent is extended or adjusted under 35 U.S.C. 154(b) by 741 days.

(21) Appl. No.: 13/271,708

(22) Filed: Oct. 12, 2011

(65) Prior Publication Data

US 2012/0033917 A1 Feb. 9, 2012

Related U.S. Application Data

(63) Continuation of application No. 13/050,010, filed on Mar. 17, 2011, now abandoned.

(60) Provisional application No. 61/315,430, filed on Mar. 19, 2010.

(51) Int. Cl.
*G02B 6/32* (2006.01)
*G02B 6/38* (2006.01)
*G02B 6/42* (2006.01)

(52) U.S. Cl.
CPC .............. *G02B 6/3853* (2013.01); *G02B 6/322* (2013.01); *G02B 6/3849* (2013.01); *G02B 6/4214* (2013.01); *G02B 6/4292* (2013.01); *G02B 6/3826* (2013.01)

(58) Field of Classification Search
CPC ............................. G02B 6/325; G02B 6/3853

USPC ...................................................... 385/74, 79
See application file for complete search history.

(56) References Cited

U.S. PATENT DOCUMENTS

| 4,213,677 | A | 7/1980 | Sugimoto et al. | 350/96.18 |
| 4,268,112 | A | 5/1981 | Peterson | 350/96.18 |
| 4,421,383 | A | 12/1983 | Carlsen | |

(Continued)

FOREIGN PATENT DOCUMENTS

| AU | 199898138 B2 | 8/1999 | G02B 6/32 |
| EP | 0032722 A1 | 7/1981 | |

(Continued)

OTHER PUBLICATIONS

Patent Cooperation Treaty, International Search Report and Written Opinion, May 24, 2011, 8 pgs.

(Continued)

*Primary Examiner* — Tina Wong
*Assistant Examiner* — John M Bedtelyon
(74) *Attorney, Agent, or Firm* — Robert L. Carlson

(57) ABSTRACT

Small-form-factor fiber optic interface devices with an internal lens are disclosed. The fiber optic interface devices have a ferrule with a bore that supports an optical waveguide. The lens is on or adjacent the ferrule front end and is aligned with the bore. A first planar surface is provided on or adjacent the lens. The first planar surface interfaces with a second planar surface of a second fiber optic interface device to form a fiber optic interface assembly having a liquid-displacing interface when the first and second fiber optic interface devices are engaged.

9 Claims, 22 Drawing Sheets

(56) References Cited

U.S. PATENT DOCUMENTS

| | | | |
|---|---|---|---|
| 4,701,011 A | 10/1987 | Emkey et al. | 350/96.18 |
| 4,718,744 A * | 1/1988 | Manning | 385/79 |
| 5,172,271 A | 12/1992 | Sinclair | 359/652 |
| 5,384,874 A | 1/1995 | Hirai et al. | 385/34 |
| 5,708,743 A * | 1/1998 | DeAndrea et al. | 385/88 |
| 5,784,512 A | 7/1998 | Hensen | 385/61 |
| 5,832,153 A | 11/1998 | Duck | 385/34 |
| 5,850,493 A | 12/1998 | Cheng | 385/34 |
| 5,923,802 A | 7/1999 | Giebel et al. | 385/76 |
| 6,012,852 A | 1/2000 | Kadar-Kallen et al. | 385/74 |
| 6,033,125 A | 3/2000 | Stillie et al. | 385/75 |
| 6,142,678 A | 11/2000 | Cheng | |
| 6,157,485 A | 12/2000 | Cheng | 359/495 |
| 6,246,026 B1 | 6/2001 | Vergeest | 219/121.72 |
| 6,542,665 B2 | 4/2003 | Reed et al. | 385/34 |
| 6,632,025 B2 | 10/2003 | Ukrainczyk | 385/70 |
| 6,655,850 B2 | 12/2003 | Mann et al. | 385/34 |
| 6,687,434 B2 | 2/2004 | Ishikawa | 385/34 |
| 6,736,547 B2 | 5/2004 | Stevens et al. | 385/61 |
| 6,837,625 B2 | 1/2005 | Schott et al. | 385/60 |
| 6,899,464 B2 | 5/2005 | Stevens et al. | 385/53 |
| 6,963,687 B2 | 11/2005 | Vergeest et al. | 385/123 |
| 7,077,576 B2 | 7/2006 | Luther et al. | 385/59 |
| 7,104,701 B1 | 9/2006 | Durrant et al. | 385/74 |
| 7,329,050 B1 | 2/2008 | Dugan et al. | 385/55 |
| 7,346,236 B2 | 3/2008 | Asano et al. | 385/34 |
| 7,346,237 B2 | 3/2008 | Matsumura et al. | 385/34 |
| 7,357,005 B2 | 4/2008 | Matsumura et al. | 65/387 |
| 7,460,750 B2 | 12/2008 | Durrant et al. | 385/35 |
| 7,572,071 B1 | 8/2009 | Wu | 385/94 |
| 7,603,008 B2 | 10/2009 | Matsumura et al. | 385/35 |
| 7,775,725 B2 | 8/2010 | Grinderslev | 385/74 |
| 2002/0146211 A1 | 10/2002 | Stevens et al. | 385/61 |
| 2003/0012513 A1 | 1/2003 | Ukrainczyk | 385/61 |
| 2003/0021543 A1 | 1/2003 | Mann et al. | 385/74 |
| 2003/0138214 A1 | 7/2003 | Liu | |
| 2004/0009697 A1 | 1/2004 | Clark et al. | 439/362 |
| 2006/0222299 A1 | 10/2006 | Durrant et al. | 385/74 |
| 2008/0050072 A1 | 2/2008 | Durrant et al. | 385/74 |
| 2008/0279509 A1 | 11/2008 | Durrant et al. | 385/72 |
| 2009/0041412 A1 | 2/2009 | Danley et al. | 385/85 |
| 2009/0324175 A1 | 12/2009 | Everett et al. | 385/72 |
| 2009/0324176 A1 | 12/2009 | Cheng et al. | 385/73 |
| 2010/0027943 A1 | 2/2010 | Armani et al. | 385/74 |
| 2010/0104244 A1 | 4/2010 | Grinderslev | 385/74 |
| 2010/0215325 A1 | 8/2010 | Tamura et al. | 385/89 |
| 2012/0099822 A1 | 4/2012 | Kuffel et al. | 385/78 |

FOREIGN PATENT DOCUMENTS

| | | | |
|---|---|---|---|
| EP | 0036626 A1 | 9/1981 | |
| EP | 0095280 A1 | 11/1983 | |
| EP | 0150860 | 8/1985 | |
| EP | 0307487 | 3/1989 | |
| EP | 1271211 A2 | 1/2003 | |
| GB | 2184565 A | 6/1987 | |
| JP | 63-293510 | 11/1988 | G02B 6/42 |
| JP | 2042401 A | 2/1990 | |
| WO | 9000752 A1 | 1/1990 | |
| WO | 9607944 A1 | 3/1996 | |
| WO | WO01/11409 A2 | 2/2001 | G02B 23/24 |
| WO | WO03/076993 A1 | 9/2003 | G02B 6/32 |
| WO | 2006104833 A1 | 10/2006 | |

OTHER PUBLICATIONS

W. J. Tomlinson, "Applications of GRIN-rod lenses in optical fiber communications systems," Applied Optics, Apr. 1, 1980, vol. 19, No. 7, pp. 1127-1138.

Emkey, et al., "Analysis and Evaluation of Graded-Index Fiber-Lenses," Journal of Lightwave Technology, vol. LT-5, No. 9, Sep. 1987, pp. 1156-1164.

Palais, Joseph C, "Fiber coupling using graded-index rod lenses," Applied Optics, Jun. 15, 1980, vol. 19, No. 12, pp. 2011-2018.

http:\\www.cvimellesgroit.com, "Gradient-Index Lenses".

Chanclou, et al., "Design and demonstration of a multicore single-mode fiber coupled lens device," Optics Communications 233, 2004, pp. 333-339.

Senior, et al., "Misalignment losses at multimode graded-index fiber splices and GRIN rod lens couplers," Applied Optics, Apr. 1, 1985, vol. 24, No. 7, pp. 977-983.

Gilsdorf, et al., "Single-mode fiber coupling efficiency with graded-index rod lenses," Applied Optics, Jun. 1, 1994, vol. 33, No. 16, pp. 3440-3445.

Cusworth, et al., "Angular tilt misalignment loss at a GRIN rod lens coupler," Applied Optics, Jun. 1, 1986, vol. 25, No. 11, pp. 1775-1779.

* cited by examiner

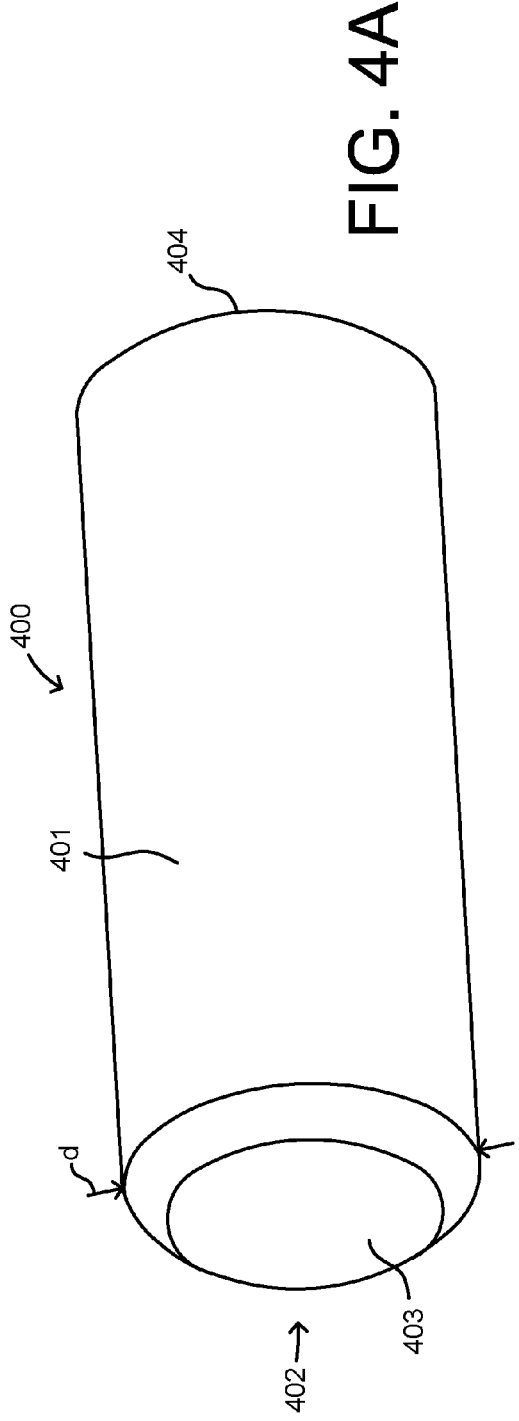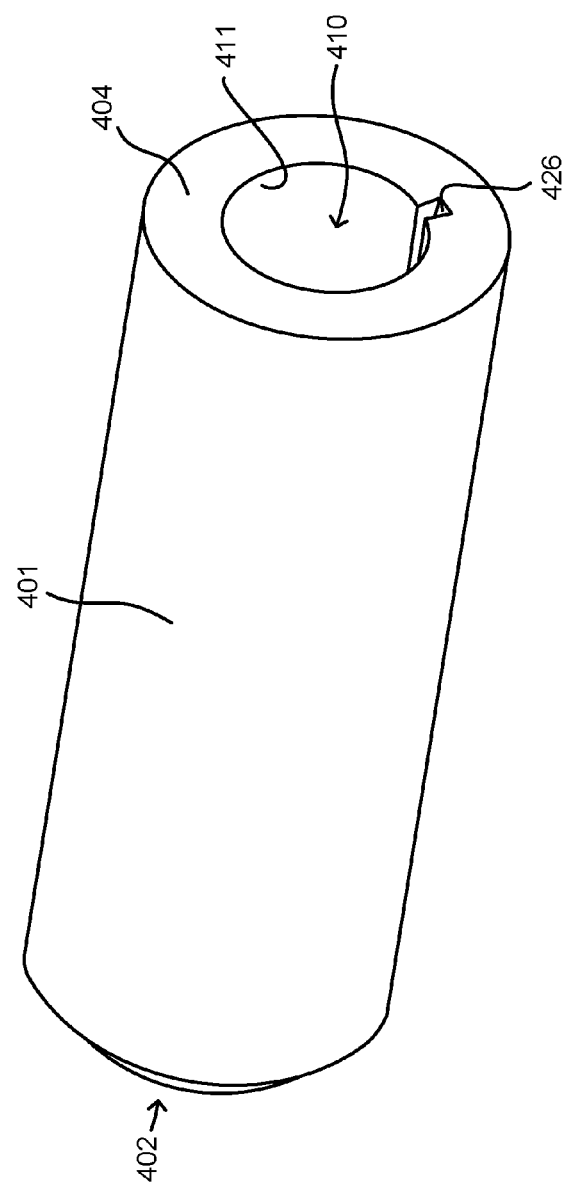

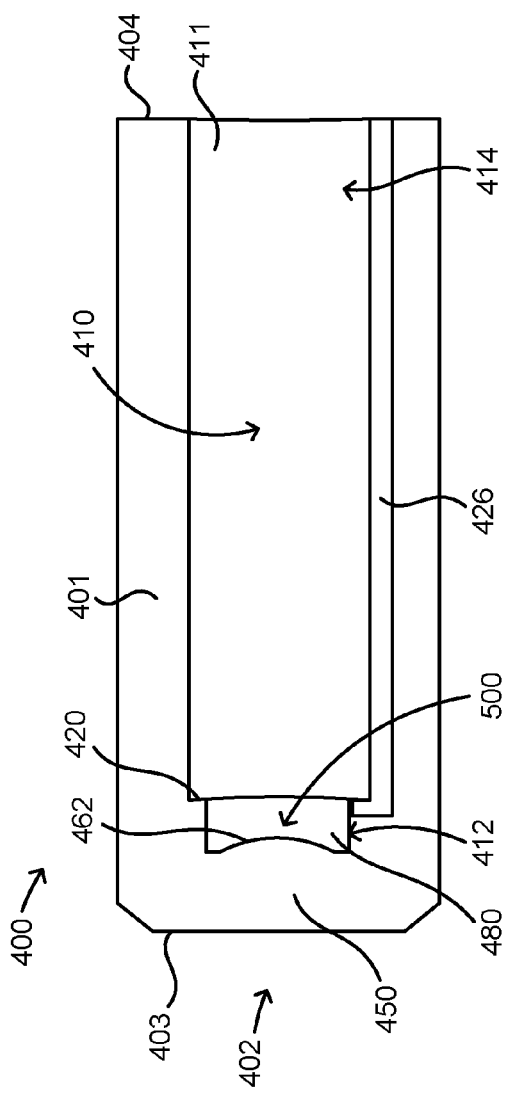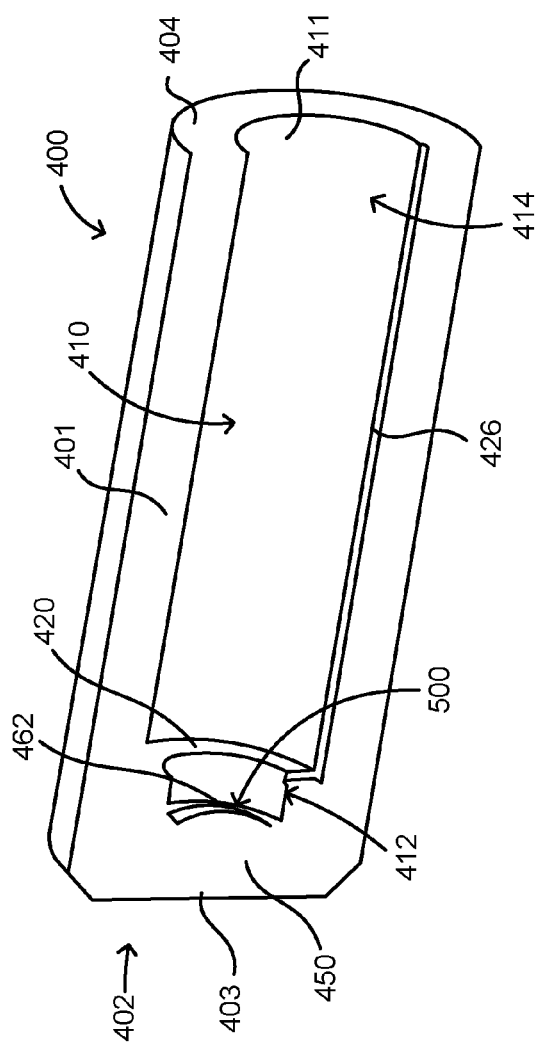

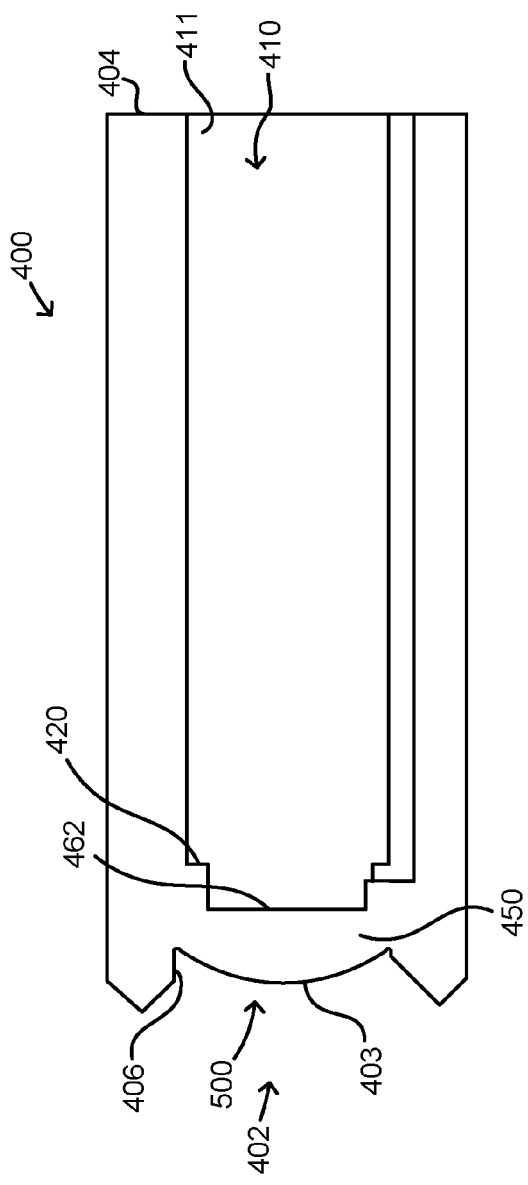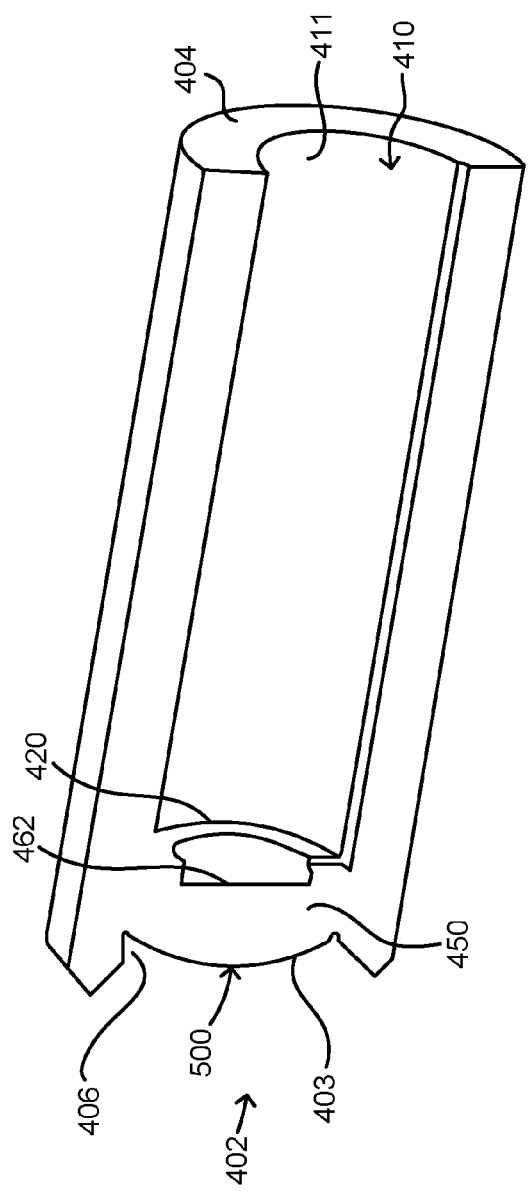

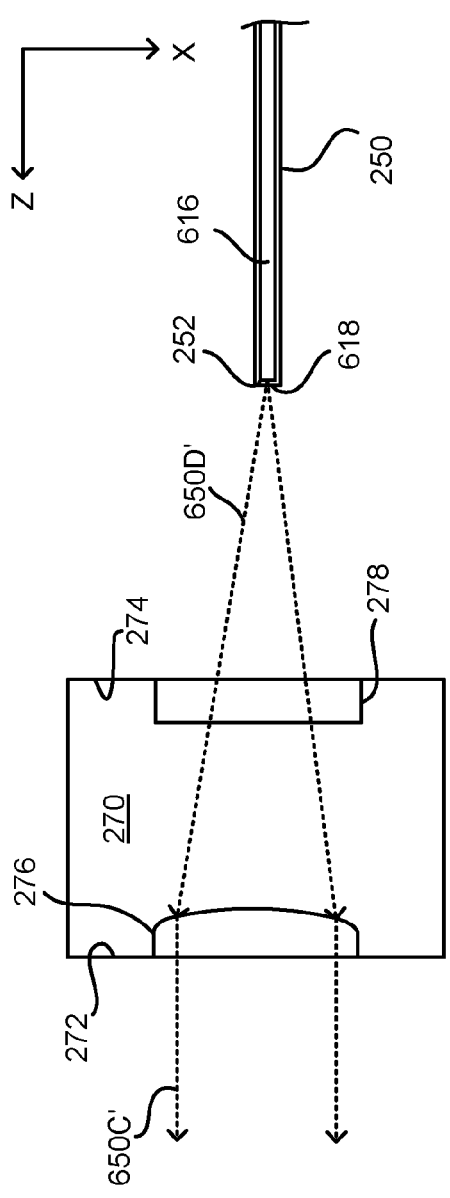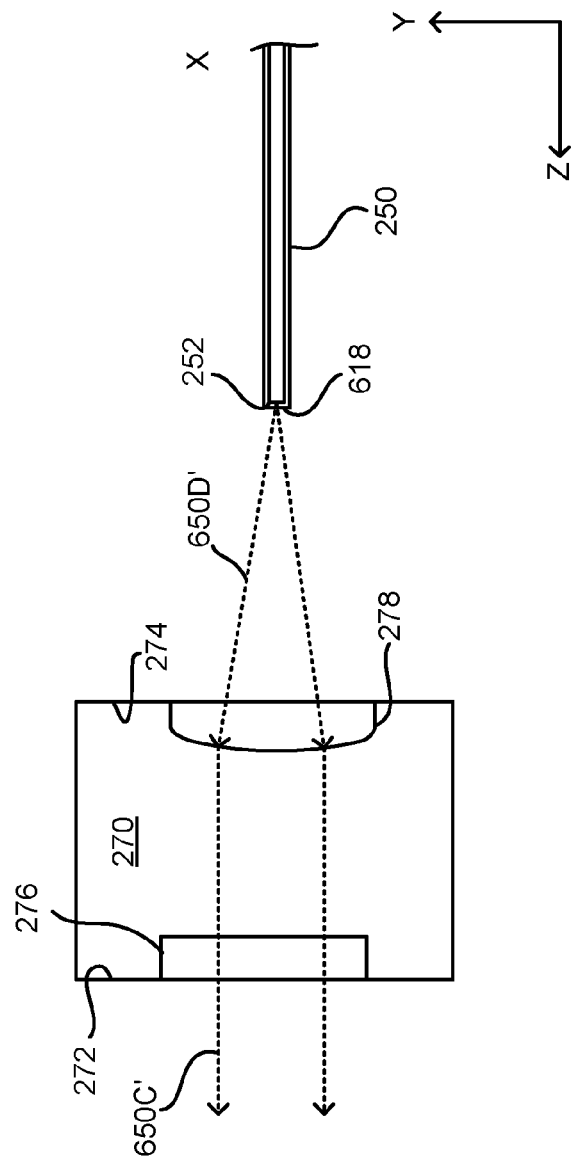

SMALL-FORM-FACTOR FIBER OPTIC INTERFACE DEVICES WITH AN INTERNAL LENS

CLAIM OF PRIORITY

This application is a continuation of U.S. patent application Ser. No. 13/050,010 filed on Mar. 17, 2011, the content of which is relied upon and incorporated herein by reference in its entirety, and the benefit of priority under 35 U.S.C. §120 is hereby claimed.

FIELD

The present disclosure relates generally to fiber optic fiber optic interface devices, and in particular relates to small-form-factor fiber optic interface devices having an internal lens.

BACKGROUND

Optical fiber is increasingly being used for a variety of applications, including but not limited to broadband voice, video, and data transmission. As consumer devices are steadily using more bandwidth, connectors for these devices will likely move away from strictly electrical connections and toward using optical connections for increased bandwidth. Generally speaking, conventional fiber optic interface devices used for telecommunication networks and the like are not suitable for consumer electronic devices.

For instance, conventional fiber optic interface devices are relatively large compared with the consumer electronic devices and their interfaces. Additionally, conventional fiber optic interface devices are deployed with great care into relatively clean environments and/or cleaned by the craft before connecting to the device interface. Further, even though fiber optic interface devices are reconfigurable (i.e., suitable for mating/unmating), they are not intended for a relatively large number of mating cycles. Instead, conventional fiber optic interface devices are high-precision devices designed for reducing insertion loss between mating devices in the optical network.

On the other hand, the consumer electronic devices are expected to have a relatively large number of mating/unmating cycles during ordinary operation. The consumer electronic devices will be operated in a multitude of environments where contaminants such as dirt, dust, and other debris are encountered on a regular basis. Further, consumer electronic devices typically have size and space constraints for making connections. Consequently, there is an unresolved need for fiber optic interface devices suitable for consumer electronic devices.

SUMMARY

An aspect of the disclosure is a ferrule assembly for a first fiber optic interface device for engaging a second fiber optic interface device having a second planar surface. The ferrule assembly includes a ferrule having a front end and a bore configured to support an optical waveguide. The bore has an end at or adjacent the ferrule front end. The ferrule assembly also includes a lens on or adjacent the ferrule end. The lens is aligned with the bore and is operably arranged relative to the bore end. The ferrule assembly also includes a first planar surface provided on or adjacent the lens. The first and second planar surfaces define a liquid-displacing interface when the first and second fiber optic interface devices are engaged.

In an example of the above-described ferrule assembly, the lens is defined by an internal surface of an endcap that fits over the ferrule front end, with the endcap external surface serving as the first planar surface. In another example of the above-described ferrule assembly, the lens is defined by an external surface of the endcap, and a transparent member covers the endcap external surface, with the transparent member having a planar surface that defines the first planar surface. The lens may also be a gradient index (GRIN) lens that has a front surface that defines the first planar surface. In an example, the GRIN lens may be of the type formed by ionic diffusion into glass rods, or may be of the type formed by drawing a pre-form so that it has a select size and refractive index profile. An example pre-form is an optical fiber preform used to form gradient-index optical fibers.

Another aspect of the disclosure is a ferrule assembly for a first fiber optic interface device configured to engage a second fiber optic interface device having a second planar surface. The ferrule assembly includes a ferrule having a front end and a bore configured to support an optical waveguide. The bore has an end that terminates within the ferrule at a distance from the ferrule front end. The assembly also includes a lens having a front convex surface, with the lens aligned with the bore. The assembly further includes a substantially transparent member disposed adjacent the convex surface. The substantially transparent member has a first planar surface that when interfaced with the second planar surface defines a liquid-displacing interface when the first and second fiber optic interface devices are engaged.

Another aspect of the disclosure is a ferrule assembly for a first fiber optic interface device configured to engage a second fiber optic interface device having a second planar surface. The ferrule assembly includes a ferrule having a front end, a front section at the front end, and a bore configured to support an optical waveguide. The bore has an end at or adjacent the ferrule front end. The ferrule assembly also includes an endcap configured to fit over the ferrule front section. The endcap has a front end defined by an endwall that supports a GRIN lens having a first planar front surface substantially at the endcap front end and a rear surface immediately adjacent the ferrule front end. The first and second planar surfaces define a liquid-displacing interface when the first and second fiber optic interface devices are engaged. The GRIN lens may be of the types as formed by the two different techniques mentioned above.

Another aspect of the disclosure is a ferrule assembly for a first fiber optic interface device configured to engage a second fiber optic interface device having a second planar surface. The ferrule assembly includes a ferrule body having a front end that defines a first planar surface, and an internal cavity having a front surface and a rear surface. The ferrule has a bore that supports an optical waveguide having an end. The bore terminates at a bore end within the ferrule body adjacent the internal cavity rear surface. The optical waveguide end resides substantially at the bore end. An example optical waveguide is an optical fiber. The ferrule includes a first cylindrical lens on the internal cavity front surface and that as optical power in a first direction. The ferrule also has a second cylindrical lens on the internal cavity rear surface that is axially spaced apart from the first cylindrical lens. The second cylindrical lens has optical power in a second direction orthogonal to the first direction. The first and second planar surfaces define a liquid-displacing interface when the first and second fiber optic interface devices are mated.

Another aspect of the disclosure is a method of transmitting light through a liquid-displacing interface. The method includes supporting in a ferrule of a ferrule assembly an optical fiber having an end. The ferrule supports a lens operably arranged relative to the optical fiber end. The ferrule assembly has a front end that defines a first planar front surface. The method also includes interfacing the first planar front surface with a second planar front surface of a light-transmitting member to define the liquid-displacing interface. The method further includes transmitting the light through the optical fiber, through the lens and through the liquid-displacing interface and to light-transmitting member.

It is to be understood that both the foregoing general description and the following detailed description present embodiments of the disclosure, and are intended to provide an overview or framework for understanding the nature and character of the disclosure as it is claimed. The accompanying drawings are included to provide a further understanding of the disclosure, and are incorporated into and constitute part of this specification. The drawings illustrate various exemplary embodiments of the disclosure, and together with the description serve to explain the principles and operations of the disclosure.

BRIEF DESCRIPTION OF THE DRAWINGS

FIG. 4A and FIG. 4B are front and rear elevated views of an example endcap for a fiber optic interface device;

FIG. 5A and FIG. 5B are cross-sectional views of the example endcap of FIG. 4A and FIG. 4B;

FIG. 8A and FIG. 8B are similar to FIG. 5A and FIG. 5B, and illustrate another example embodiment of an endcap for fiber optic interface device, where the endcap has a lens formed on the endcap front surface;

FIG. 12A and FIG. 12B are close-up, cross-sectional views of the ferrule internal cavity and the optical fiber supported in the ferrule bore, with the cross-section of FIG. 12A taken in the X-Z plane and cross-section of FIG. 12B taken in the Y-Z plane;

DETAILED DESCRIPTION

Figure 1A:
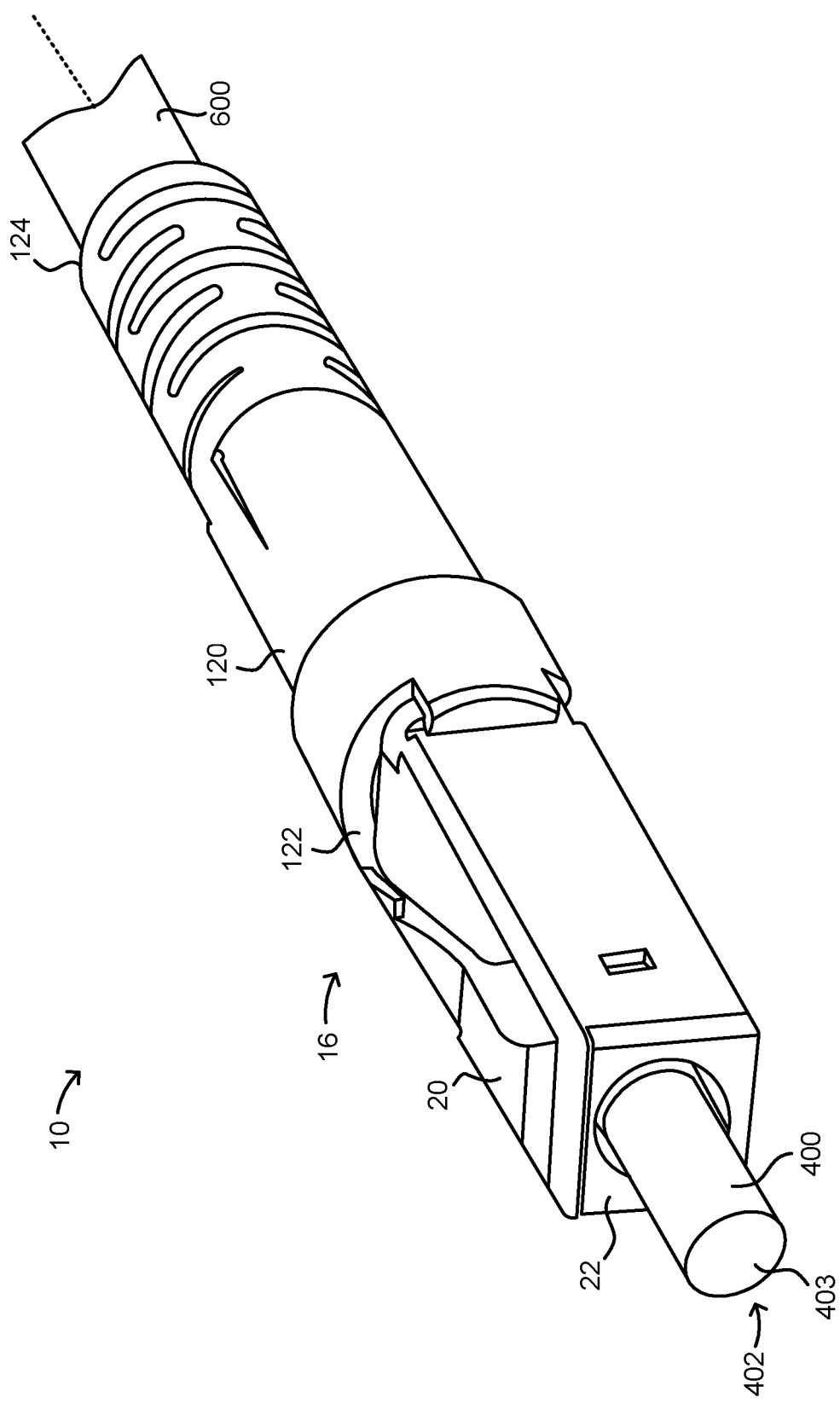
FIG. 1A is a front elevated view of an example fiber optic interface device in the form of a plug having a main housing that comprises front and rear housings.

Reference is now made in detail to the present preferred embodiments of the disclosure, examples of which are illustrated in the accompanying drawings. Whenever possible, like or similar reference numerals are used throughout the drawings to refer to like or similar parts. Various modifications and alterations may be made to the following examples within the scope of the present disclosure, and aspects of the different examples may be mixed in different ways to achieve yet further examples. Accordingly, the true scope of the disclosure is to be understood from the entirety of the present disclosure, in view of but not limited to the embodiments described herein.

In some of the Figures, Cartesian coordinates are shown for reference. Also, the terms "plug" and "receptacle" are used as shorthand terms to distinguish between different types of fiber optic interface devices that form part of a fiber optic interface assembly, which is referred to below as a "connector assembly." Further, in some of the examples discussed below, the receptacle is part of an electronic device, and is configured to receive a plug.

The term electronic device as used herein means a device that has either electronic or both optical and electronic components and functionality, including a fiber optic interface device and associated hardware (e.g., an integrated optical engine) that can receive, transmit or both transmit and receive optical signals.

Figure 1B:
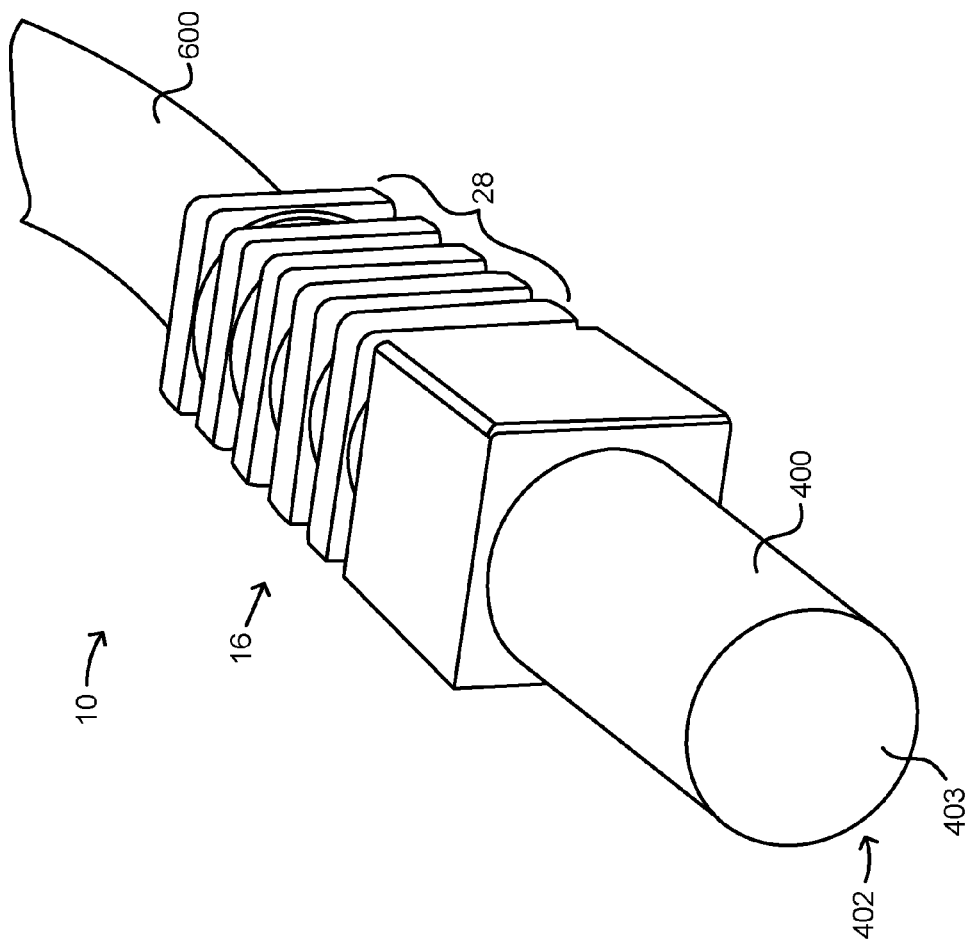
FIG. 1B is a front elevated view of another example fiber optic interface device having a single unitary housing.

FIG. 1A is a front elevated view of an example fiber optic interface device ("plug") 10. Plug 10 is shown as having a two-part construction by way of illustration. However, one skilled in the art will appreciate that other configurations, including various unitary configurations, can be implemented based on the description set forth herein. A plug 10 having a housing 16 with a unitary construction is illustrated in FIG. 1B by way of example. The housing 16 of FIG. 1B includes a strain-relief section (boot) 28.

Figure 2:
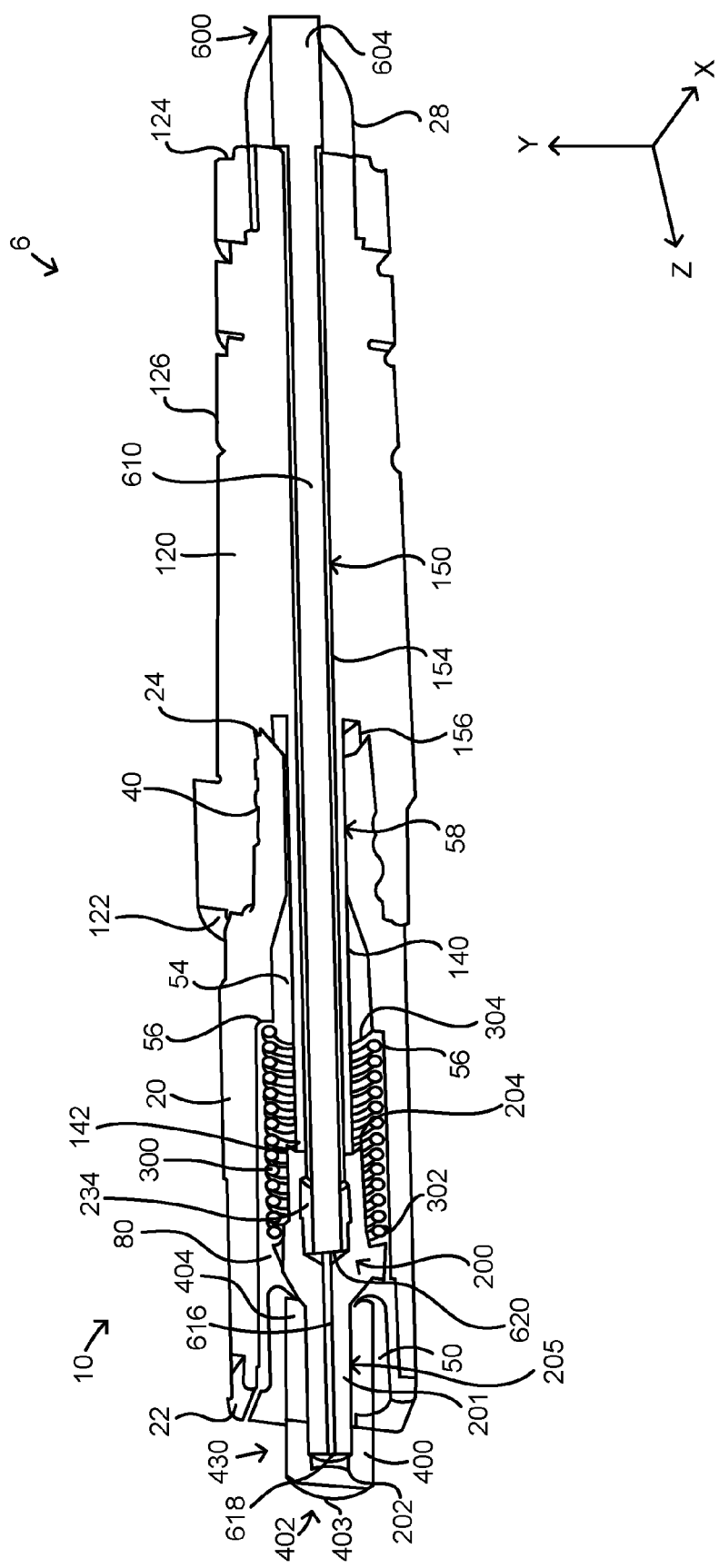
FIG. 2 is a cross-sectional view of the fiber optic interface device of FIG. 1A as seen in the Y-Z plane, and including an optical fiber.

FIG. 2 is a cross-sectional view of the plug 10 of FIG. 1A as seen in the Y-Z plane along with an optical fiber cable 600 that carries at least one optical fiber 602. Plug 10 and optical fiber cable 600 constitute a fiber optic interface assembly 6.

With reference to FIG. 2, plug 10 has a main housing 16 shown as comprised of a front housing 20 mated with a rear housing 120. Front housing 20 has front and rear ends 22 and 24, an outside surface 26 and an interior 50. Front housing 20 includes a narrow rear section 40 at rear end 24. Interior 50 includes a front section 52 that transitions to a narrower mid-section 54 at an interior ledge 56. Interior mid-section 54 in turn narrows down to a rear lead-in section 58 associated with narrow rear section 40.

Rear housing 120 includes front and rear ends 122 and 124, an outer surface 126 and an interior 150. Rear housing interior 150 includes a channel 154 defined in part by a tube section 140 that extends beyond rear housing front end 122 and that has a front end 142. Rear housing interior 150 also includes an annular slot 156 surrounding tube section 140 at rear housing front end 122. Annular slot 156 is configured to receive narrow rear section 40 of front housing 20, with tube section 140 extending through rear lead-in section 58 and into mid-section 54 of front housing 20.

Figure 3:
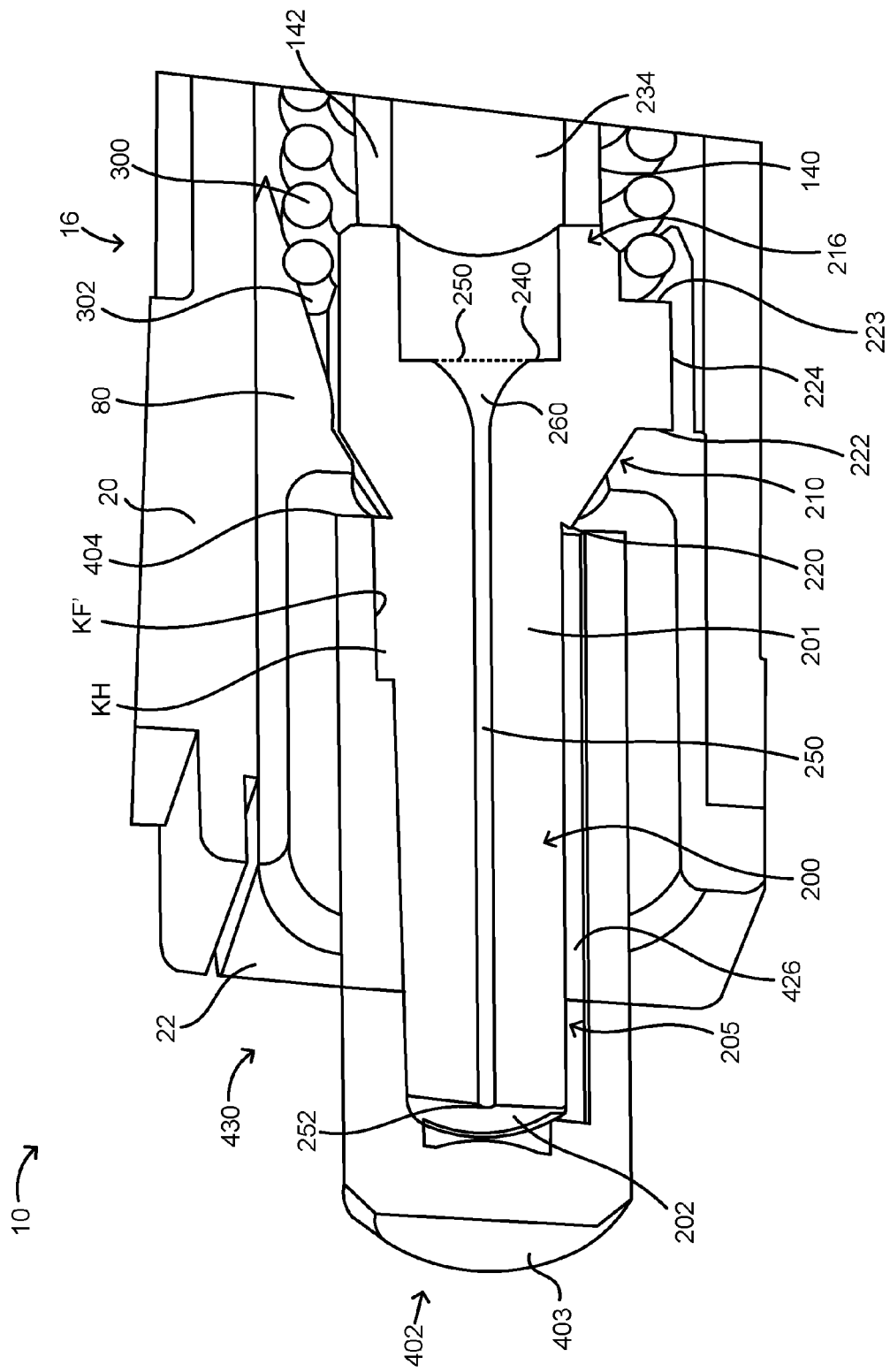
FIG. 3 is a close-up cross-sectional view of the front end of the fiber optic interface device shown in FIG. 2.

FIG. 3 is a close-up cross-sectional view of the front end of the plug 10 as shown in FIG. 2. Front housing 20 includes a plug ferrule holder 80 supported within front housing interior 50 at front section 52. Plug ferrule holder 80 is configured to support a plug ferrule 200. In other embodiments, a plug ferrule holder is not employed and front housing 20 is configured to hold plug ferrule 200. Plug ferrule 200 in combination with one or more additional components is referred to below as a plug ferrule assembly.

With reference to FIG. 2 and FIG. 3, plug ferrule 200 includes a ferrule body 201 having a front end 202 and a rear end 204. Plug ferrule 200 can have a number of configurations. The example plug ferrule 200 includes a cylindrical front section 205 adjacent the front end, a mid-section 210 and a generally cylindrical rear section 216 adjacent rear end 204. Mid-section 210 is flared and is configured so that plug ferrule front section 205 is narrower than plug ferrule rear section 216. The transition from front section 205 to mid-section 210 includes a step 220 and the transition from the mid-section 210 to rear section 216 includes front and rear steps 222 and 223 defined by a ridge 224. Rear section 216 defines an open rear interior section 234 open at rear end 204 and extending into the rear section up until an internal endwall 240. Plug ferrule 200 includes a central bore 250 having a front end 252 at the front end 202 of the plug ferrule and a rear end 254 at internal endwall 240. In an example, central bore 250 includes a flared portion 260 adjacent internal endwall 240.

Front end 142 of tube section 140 of rear housing 120 extends into plug ferrule rear interior section 234 and is snugly held therein. A resilient member 300 having a front end 302 and a rear end 304 is arranged around a portion of plug ferrule rear section 216 and a portion of tube section 140 of rear housing 120. Resilient member 300 is held in place at its front end 302 by rear step 223 of plug ferrule rear section 216 and by ledge 56 that defines the transition between the housing interior front section 52 and mid-section 54. In an example, resilient member 300 comprises a cylindrical spring, as shown.

Plug 10 further includes a substantially transparent plug endcap 400 configured to fit over front section 205 of plug ferrule 200. The combination of the plug endcap 400 and plug ferrule 200 constitutes a plug ferrule assembly 430. FIG. 4A and FIG. 4B are front and rear elevated views of an example plug endcap 400, and FIG. 5A and FIG. 5B are cross-sectional views of the example plug endcap of FIG. 4A and FIG. 4B. Plug endcap 400 has a body 401 with a front end 402 having a front surface 403, and an opposite rear end 404. Plug endcap body 401 has an interior 410 defined by interior sidewall 411. Interior 410 has a front section 412 and a rear section 414 open at rear end 404. In an example, front section 412 has a smaller diameter than rear section 414, with the transition between these interior sections defined by a step 420. Interior 410 includes a longitudinal venting slot 426 formed in interior sidewall 411 and that extends from rear end 404, through rear interior section 414 and part-way into front interior section 412. Venting slot 426 serves as a vent that allows air to escape while placing plug endcap 400 over front section 205 of plug ferrule 200.

In an example where plug ferrule front section 205 is cylindrical, plug endcap 400 has an interior 410 that is also cylindrical so that the plug endcap can slidingly engage with and cover the plug ferrule front section to form plug ferrule assembly 430.

The front section 412 of plug endcap interior 410 is defined in part by an endwall 450 that defines endcap front surface 403 and that also includes an interior surface 462 opposite the front surface. In an example, interior endwall surface 462 is curved, such as shown in FIGS. 5A and 5B. Thus, the planar front surface 403 of plug endcap 400, the curved surface of interior endwall 462, and the intervening body portion 401 of endwall 450 constitute a plug lens 500. In an example, endcap 400 is made of a material that is substantially transparent to the wavelength of operation, for example to wavelengths in the range 850±50 nm, or 1310±50 nm, or 1550±50 nm, or generally in the range from 800 nm to 1600 nm. Example materials for endcap 400 include Polyetheremide ((PEI), sold by the General Electric Company under the trademarked name ULTEM® 1010).

When plug endcap 400 is placed over front section 205 of plug ferrule 200 to form plug ferrule assembly 430, plug endcap rear end 204 butts up against step 220 at the transition from the plug ferrule front section 205 to mid-section 210. This places endcap 400 in the proper position relative to plug ferrule 200 and defines a gap 480 between plug ferrule front surface 203 and endcap endwall 450. In an example, gap 480 has an axial width that is substantially the same as the focal length of plug lens 500, i.e., the plug lens and plug ferrule front end 202 are separated by about the focal length of the plug lens.

With reference again to FIG. 3, in an example ferrule 200 and endcap 400 include respective keying features KF and KF' that allow for a select orientation of the endcap on the ferrule.

With reference again to FIG. 2, optical fiber cable 600 includes a jacketed section 604, a buffered section 610 and a bare optical fiber section 616 that has an end 618. The transition from bare fiber section 616 to buffered section 610 includes a transition step 620. Buffered section 610 resides within rear housing channel 154 including tube section 140 so that the transition step 620 contacts plug ferrule internal endwall 240. Bare fiber section 616 resides in plug ferrule central bore 250 so that bare fiber end 618 resides at or close to plug ferrule front end 202. Note that flared portion 260 of central bore 250 adjacent internal endwall 240 serves to facilitate the insertion of bare optical fiber section 616 into the central bore.

Figure 6:
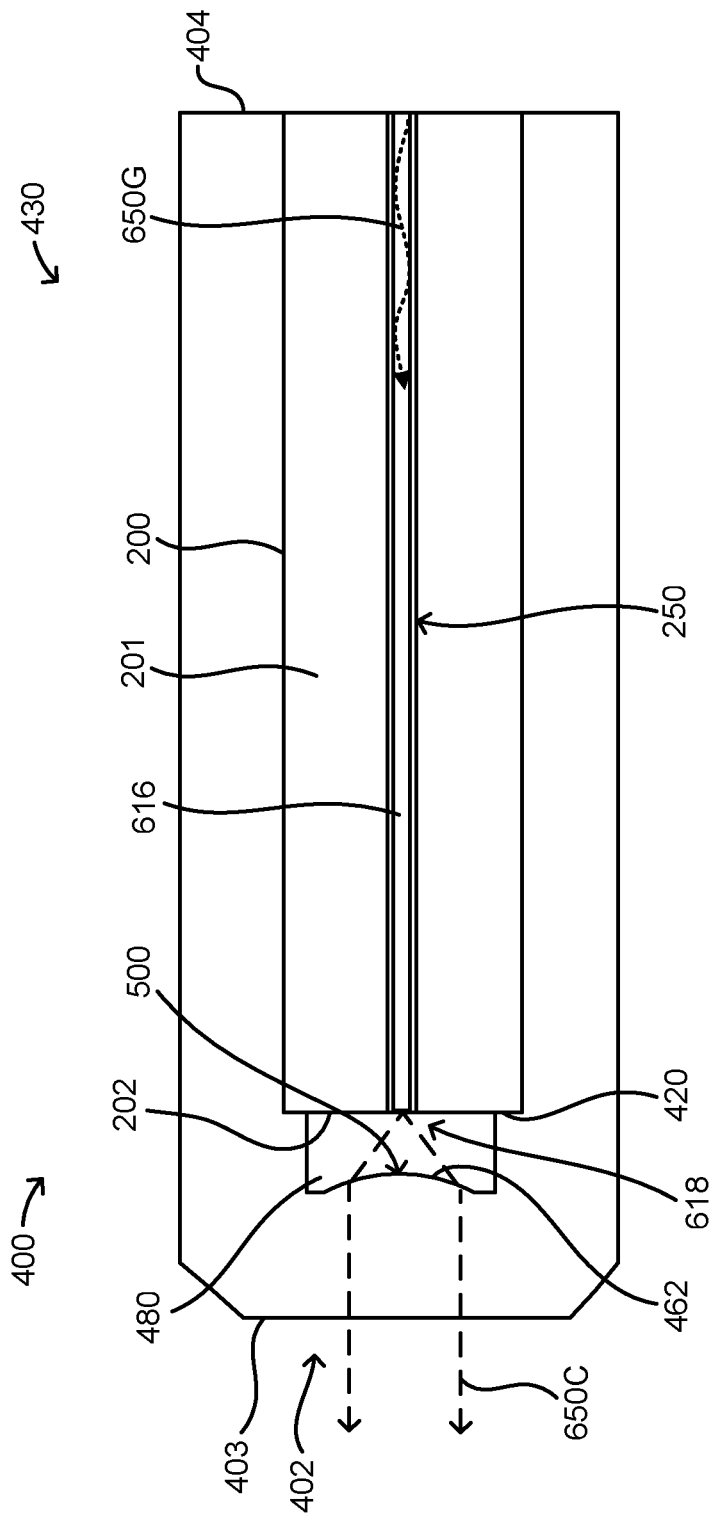
FIG. 6 is a close-up cross-sectional view of the ferrule assembly for the fiber optic interface device, illustrating how the internal lens of the endcap serves to collimate light from an optical fiber supported in the ferrule.

FIG. 6 is a close-up, cross-sectional view of plug ferrule assembly 430 showing the plug endcap 400 in place covering plug ferrule front end 202. Bare optical fiber section 616 resides within plug ferrule central bore 250 so that bare optical fiber section end 618 is in substantially the same plane as plug ferrule front end 202. Light 650 traveling in optical fiber 602 from a light source (not shown) attached to the far end of optical fiber cable 600 reaches bare optical fiber end 618. Light 650 diverges as it exits bare optical fiber end 618 and travels across gap 480 to lens surface 460. Light 650 refracts at lens surface 460 and becomes substantially collimated light 650C. Substantially collimated light 650C continued to travel through plug lens 500 and exits endcap front surface 403 as a substantially collimated light beam.

Figure 7A:
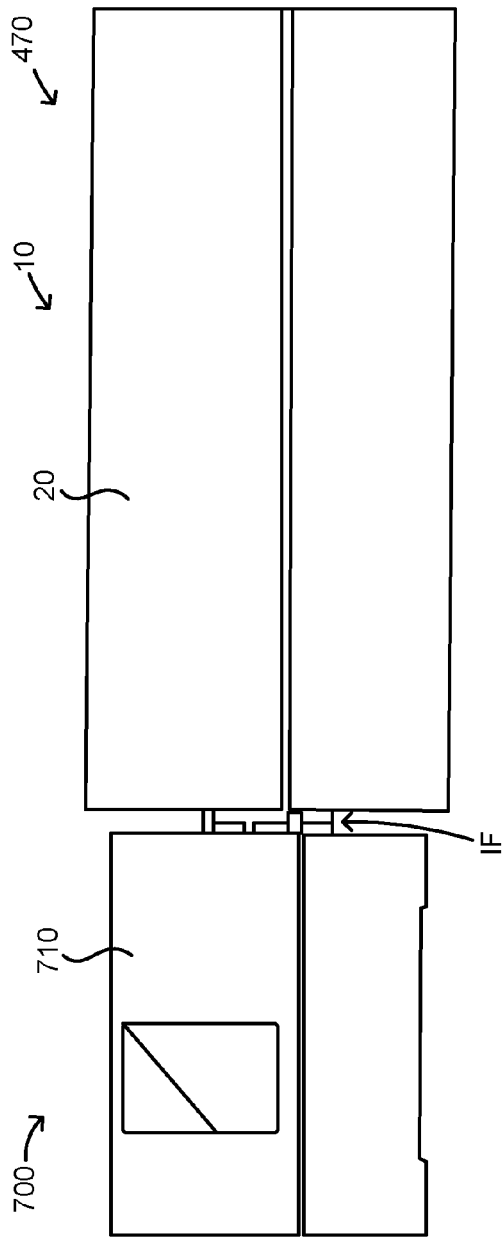
FIG. 7A is a top elevated view of the fiber optic interface device shown operably engaged with an another fiber optic interface device by interfacing their respective planar surfaces to form a fiber optic interface assembly.
Figure 7B:
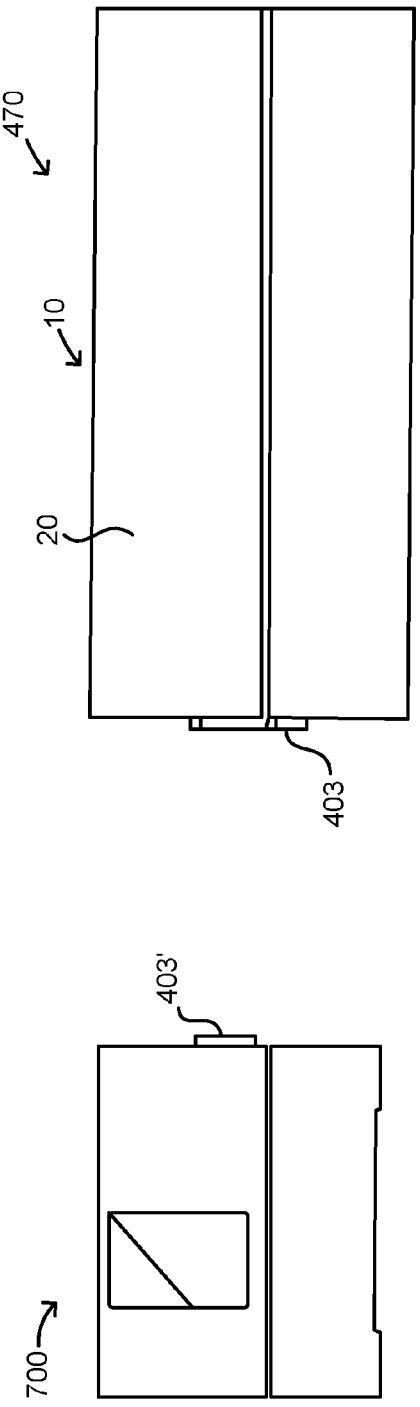
FIG. 7B is a similar view to FIG. 7A, but with the two fiber optic interface devices disengaged and showing the respective planar surfaces.

FIG. 7A is a top elevated view of plug 10 shown operably engaged with an example fiber optic interface device ("receptacle") 700 to form a fiber optic interface assembly 470 having a planar-surface to planar-surface interface IF, as described below. FIG. 7B is similar to FIG. 7A, but with plug 10 shown disengaged from receptacle 700, and showing the respective plug and receptacle planar interface surfaces 403 and 403'.

Figure 7C:
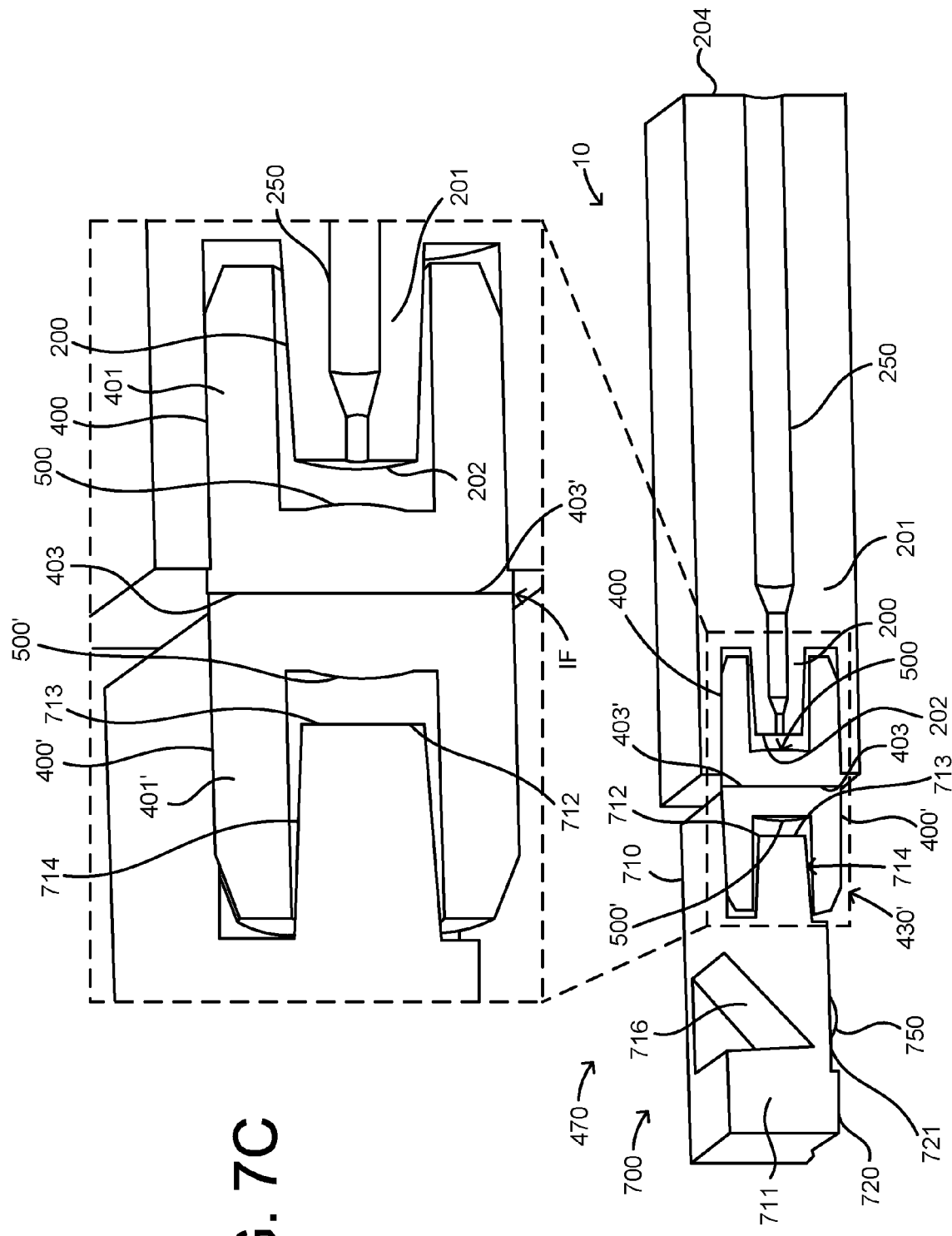
FIG. 7C is a cross-sectional view of the operably engaged fiber optic interface devices of FIG. 7A.

FIG. 7C is a cross-sectional view of the operably engaged plug 10 and receptacle 700 of FIG. 7A, and includes a close-up inset view of the interface surfaces. Receptacle 700 includes a light-transmitting member 710. Light-transmitting member has a body 711 with a front end 712 having a planar front surface 713. Light-transmitting member 710 has a front section 714 at front end 712. Light-transmitting member body 711 also has an angled surface 716 and an input/output end 720 with a surface 721 that is curved to define a convex lens 750.

In an example, light-transmitting member body 711 is made of the aforementioned material ULTEM®, which is transparent at wavelengths from 800 nm through 1600 nm. In an example, light-transmitting member 710 is formed as having a unitary body 711, and is configured via molding, machining or both.

Receptacle 700 includes a receptacle endcap 400' similar to plug endcap 400. Receptacle endcap 400' has a body 401' having a front end 402' defined by an endwall 450' having the aforementioned planar front (outer) surface 403' and an opposite interior surface 462'. The planar front surface 403', the curved surface of interior endwall 462', and the intervening body portion 401' of endwall 450' constitute a receptacle lens 500' similar to plug lens 500. Receptacle endcap 400' is configured to slide over and engage light-transmitting member front section 714 to define a receptacle light-transmitting assembly 430' that has essentially a complementary configuration to plug ferrule assembly 430.

Figure 7D:
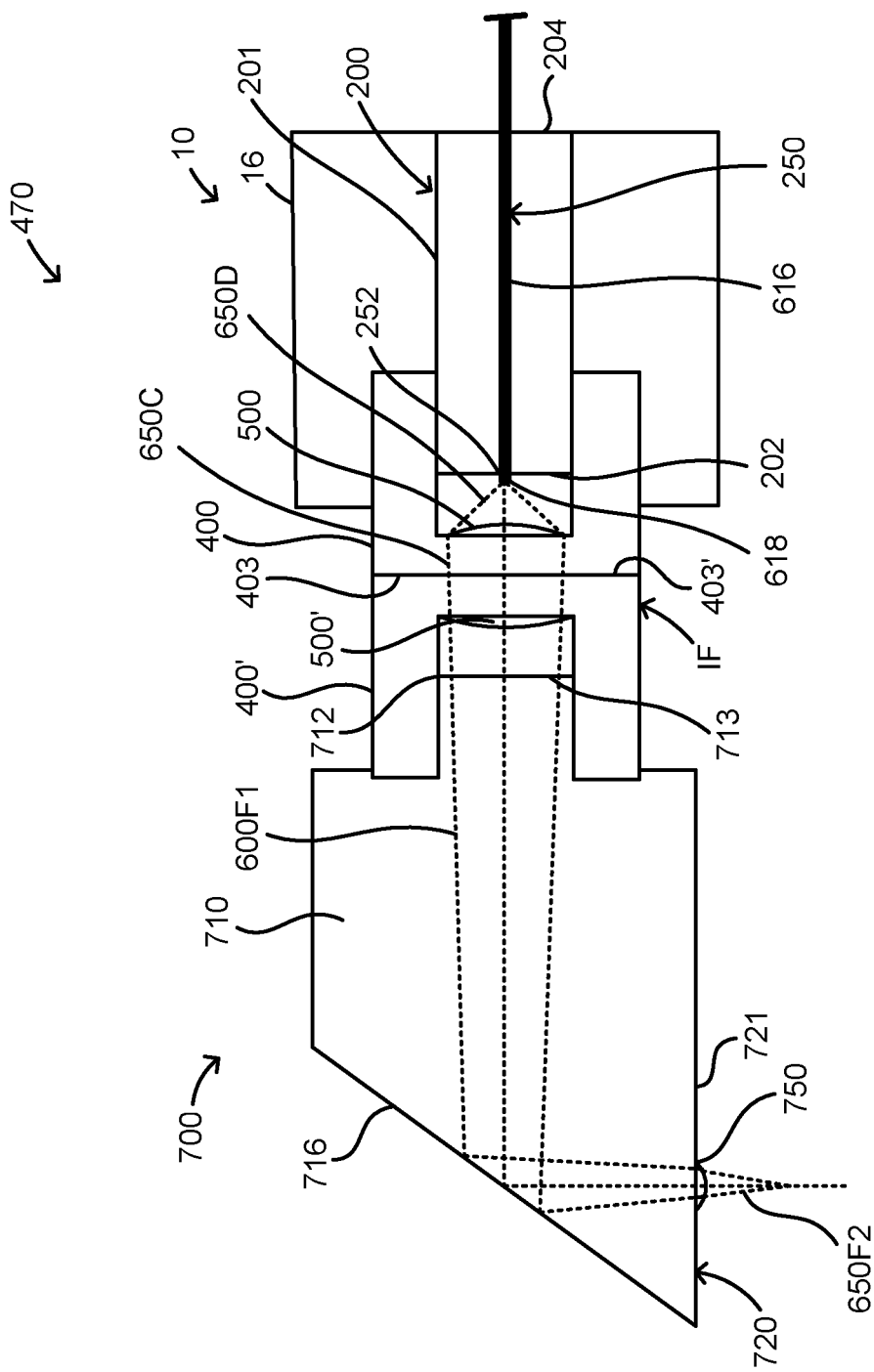
FIG. 7D is a schematic cross-sectional view of fiber optic interface assembly of FIG. 7A, illustrating an example light path from the plug and through the light-transmitting member of the receptacle.

With reference now also to FIG. 7D, plug 10 engages receptacle 700 such that the planar surfaces 403 and 403' of the plug and receptacle endcaps 400 and 400' form interface IF. Divergent light 650D is emitted from optical fiber end 618 and is incident upon plug lens 500, which forms substantially collimated light 650C. This substantially collimated light 650 travels out of plug endcap front surface 403 and through receptacle endcap front surface 403'. In an example, receptacle lens 500' has relatively low optical power and serves to slightly converge substantially collimated light 650C to form weakly focused light 650F1. This weakly focused light internally reflects from angled surface 716 and travels to another receptacle lens 750 on bottom surface 721 of input/output end 720. Lens 750 acts to more strongly converge the weakly focused light 650F1 to form more strongly focused light 650F2. In an example, the interfaced planar surfaces 403 and 403' are made to contact each other at interface IF.

Figure 7E:
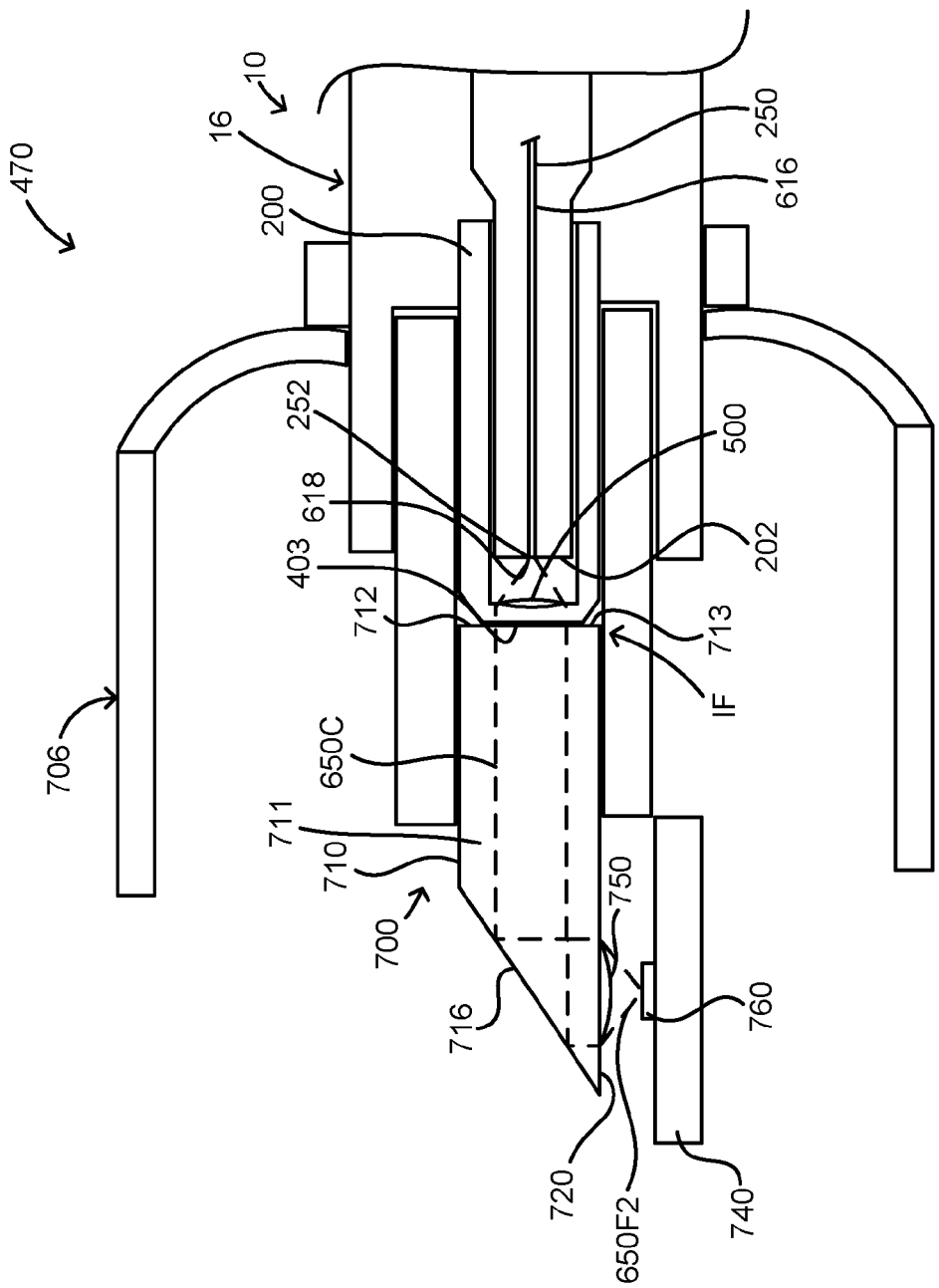
FIG. 7E is another example cross-sectional view of the operably engaged fiber optic interface devices showing more detail of the electronic device that houses one of the fiber optic interface devices.

FIG. 7E is another example cross-sectional view of the mated plug 10 and receptacle 700 as part of an electronic device 706 that houses the receptacle. In the embodiment of FIG. 7D, light-transmitting member front surface 713 is planar and is used as the interfacing surface. Also, light-transmitting member input/output end 720 is arranged adjacent a circuit board 740 supported within electronic device 706. Circuit board includes an active device 760 such as a photodetector, or a light-emitting device such as a vertical-cavity surface-emitting laser (VCSEL).

When plug 10 engages receptacle 700, the planar front surface 403 of plug endcap 400 confronts and interfaces with the planar front surface 713 of light-transmitting member 710. This allows for substantially collimated light 650C to travel out of the plug endcap front surface 403 and through planar front surface 713 of light-transmitting member 710. The substantially collimated light 650C continues to travels through body 711 of light-transmitting member 710, where it internally reflects from angled portion 716. This internal reflection directs substantially collimated light 650C to input/output end 720 of light transmitting member 710 and to convex lens 750. Convex lens 750 serves to focus substantially collimated light 650C, thereby forming strongly focused light 650F2 that converges onto active device 760 on circuit board 740. In an example, light 650 can travel in the opposite direction from electronic device 706 to plug 10 in the case where active device 760 is a light-emitting device. Also in an example, the plug and receptacle interfaced surfaces 403 and 713 are brought into contact at interface IF.

FIG. 8A and FIG. 8B are similar to FIG. 5A and FIG. 5B and illustrate another example embodiment of plug endcap 400 where end wall interior surface 462 is planar and endcap front (outer) surface 403 is curved, so that plug lens 500 is plano-convex, with the convex side on endcap front end 402. Note that end wall interior surface 462 can also be curved in defining plug lens 500. This embodiment for plug lens 500 as described is problematic in that endcap end 402 cannot provide a planar surface when interfacing plug 10 with receptacle 700. Moreover, endcap front end 402 now includes recesses 406 that can collect contaminants.

Figure 9A:
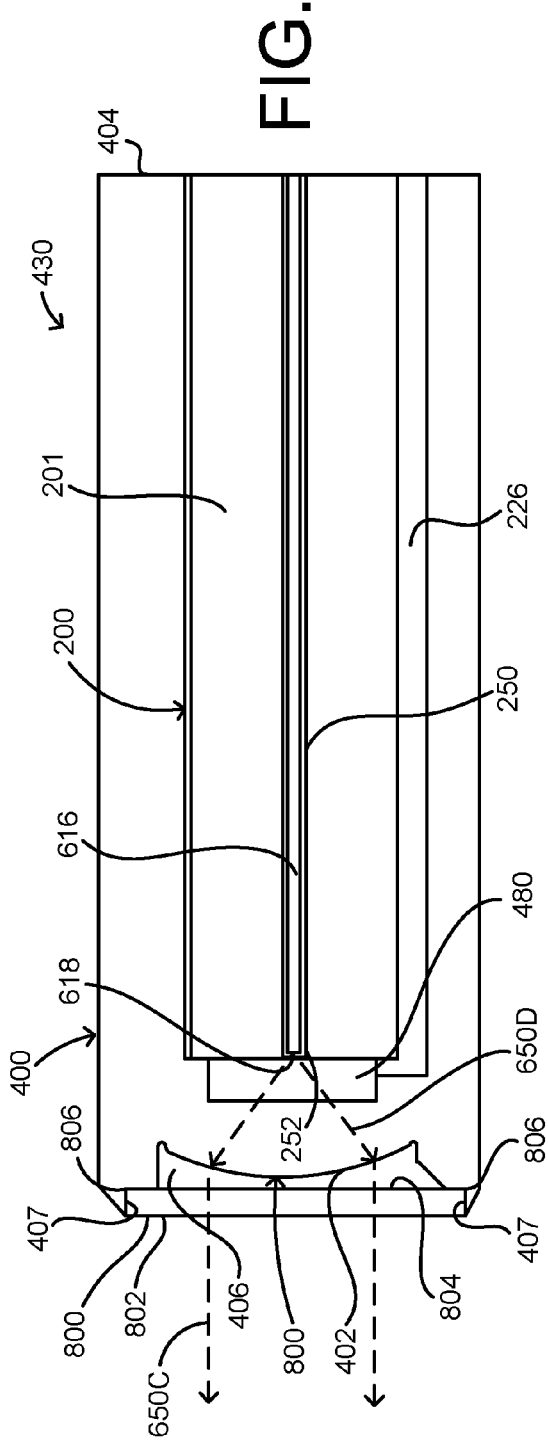
FIG. 9A is a cross-sectional view similar to FIG. 6, and shows an example where the endcap lanes is formed on the endcap front surface, and where a substantially transparent member having a planar surface is used to cover the endcap front end to define the planar interface surface.

FIG. 9A is a cross-sectional view similar to FIG. 6 and shows plug ferrule assembly 430 with the example plug endcap 400 of FIGS. 8A and 8B. However, the plug ferrule assembly 430 further includes a substantially transparent member 800 disposed at front end 402 of plug endcap 400. Substantially transparent member 800 has a front surface 802, a rear surface 804 and an edge 806. Substantially transparent member 800 provides the needed planar surface 802 that serves as the interface surface when plug 10 engages receptacle 700. Substantially transparent member 800 also serves to protect recesses 406 from collecting contaminants by making plug lens 500 an internal lens, i.e., the outer surface of plug lens 500 is not an outermost surface of plug ferrule assembly 430. If necessary, substantially transparent member 800 can include a curved or otherwise non-planar rear surface 804 so that the transparent place can serve as an additional lens element, e.g., a plano-convex or a plano-concave lens element. Substantially transparent member 800 can be made of Polyetheremide (ULTEM®) or glass or sapphire.

Figure 9C:
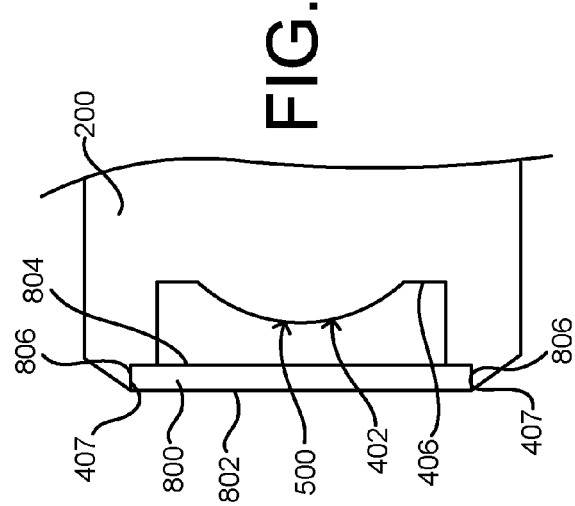
FIG. 9C is a close-up cross-sectional view of the front end of the endcap showing how the substantially transparent member is held at the front end by an annular lip.
Figure 9B:
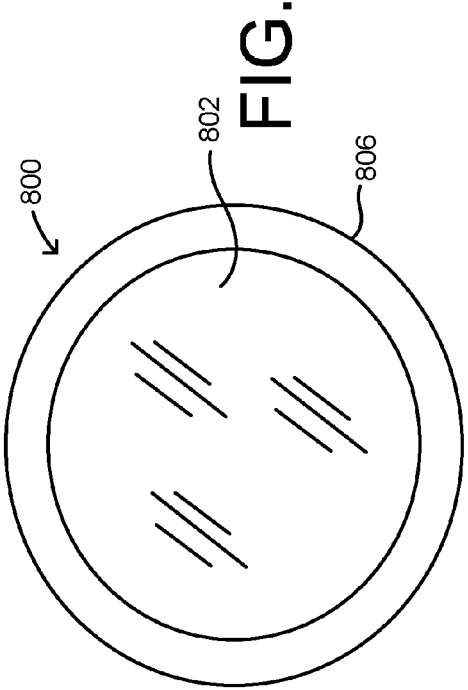
FIG. 9B is a front-on view of the substantially transparent member as held by the endcap at the endcap front end.

In an example, front end 402 of plug endcap 400 is configured to support a substantially transparent member 800. For example, endcap front end 402 can include an annular lip 407 that allows for the substantially transparent member 800 to be supported at its edge 806. FIG. 9B is a front-on view of substantially transparent member 800 held by endcap 400 at front end 402 using annular lip 407. FIG. 9C is a close-up cross-sectional view of endcap front end 402 showing how substantially transparent member 800 is held by annular lip 407.

Figure 10A:
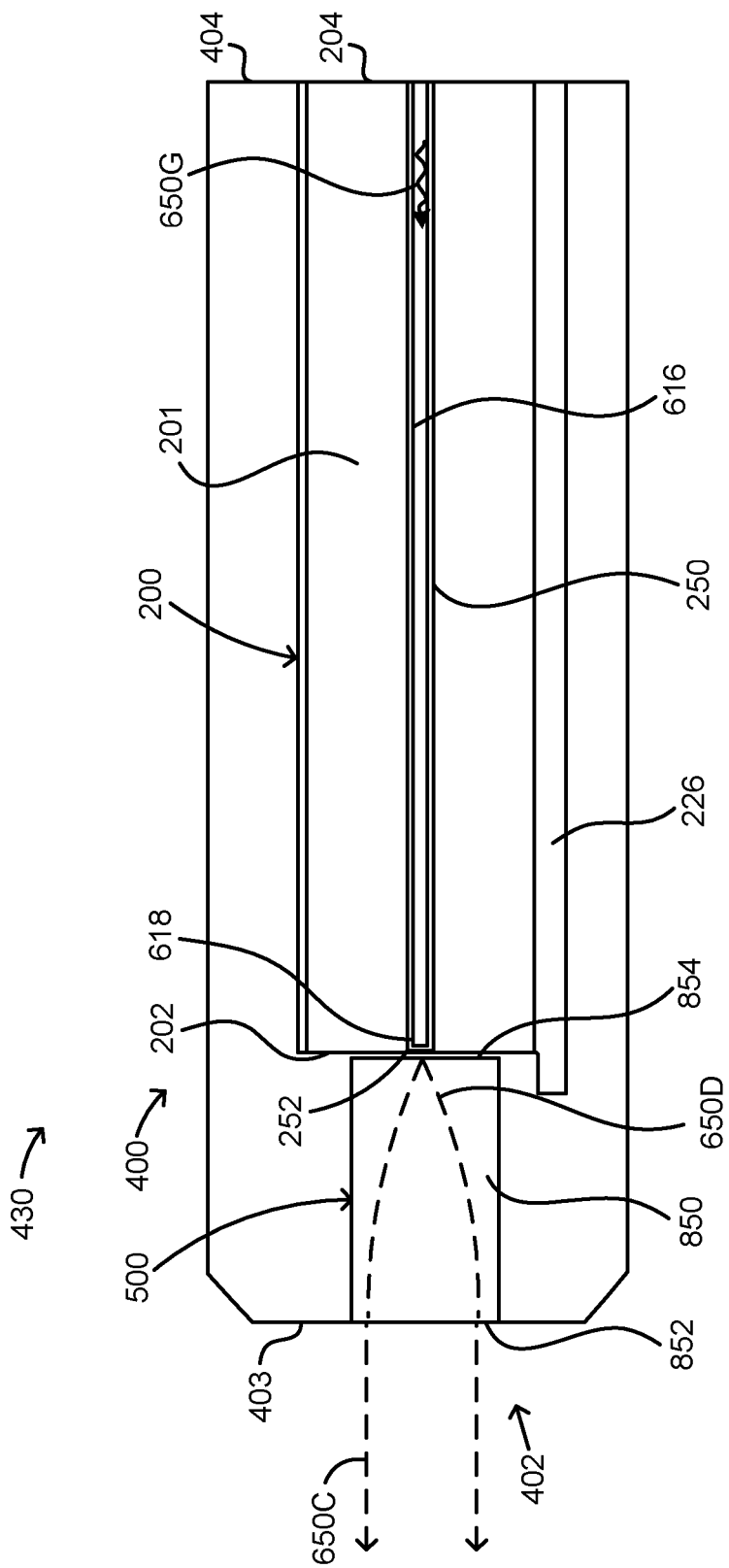
FIG. 10A is similar to FIG. 9A, and illustrates an example embodiment of a ferrule assembly for a fiber optic interface device where the endcap includes a GRIN lens.

FIG. 10A is similar to FIG. 9A and illustrates an example embodiment of plug ferrule assembly 430 where plug lens 500' comprises a GRIN lens 850. GRIN lens 850 is supported by plug endcap 400 at front end 402. GRIN lens 850 includes front end 852 at endcap front end 402 and a rear end 854 at plug ferrule front end 402 so that it contacts or nearly contacts bare optical fiber end 618. This allows guided light 650G in optical fiber 602 to enter GRIN lens 850 at GRIN lens rear end 854 just as thus the light starts to diverge from bare optical fiber end 618 to form divergent light 650D. This divergent light bends as it travels through GRIN lens 850 due to its gradient refractive index so that by the time the light exits GRIN lens front end 852 at endcap front end 402 it constitutes substantially collimated light 650C.

Figure 10B:
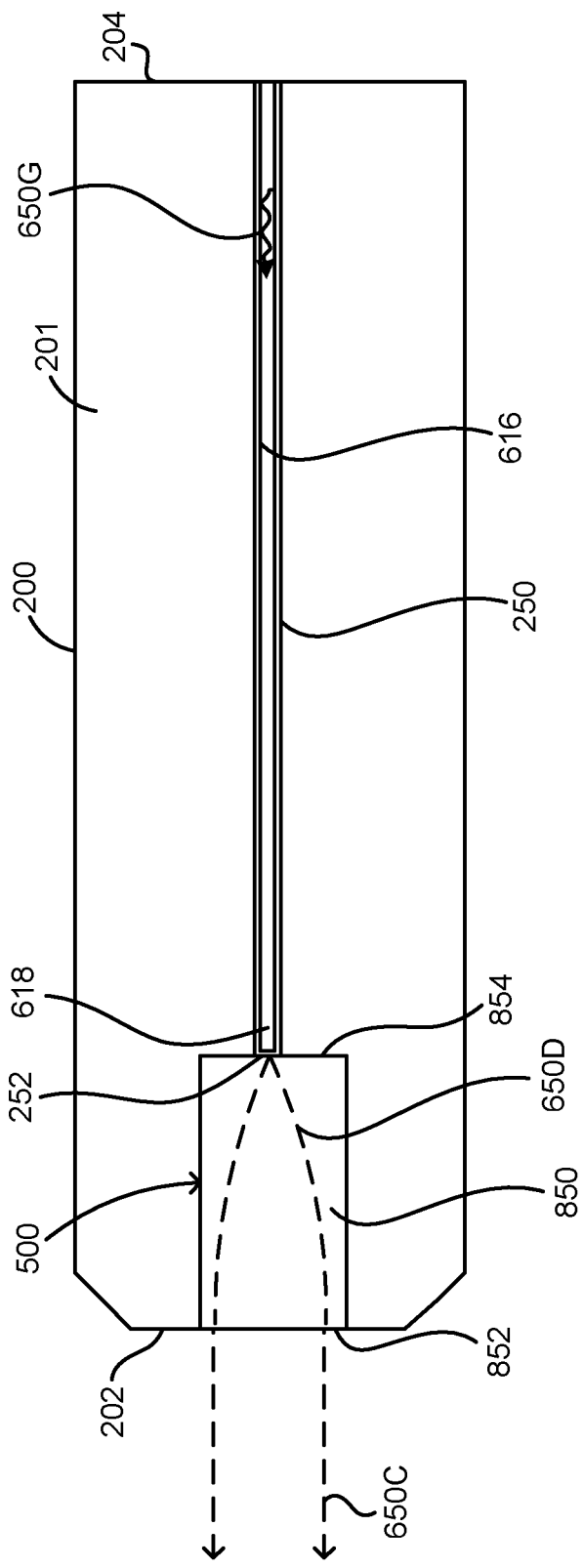
FIG. 10B is similar to FIG. 10A, and illustrates an example embodiment where the GRIN lens is incorporated directly into the ferrule so that no endcap is need to support the GRIN lens.

FIG. 10B is similar to FIG. 10A and illustrates an example embodiment where the GRIN lens 850 is incorporated directly into plug ferrule 200 at plug ferrule front end 202 so that no plug endcap is need to support the GRIN lens.

Figure 10C:
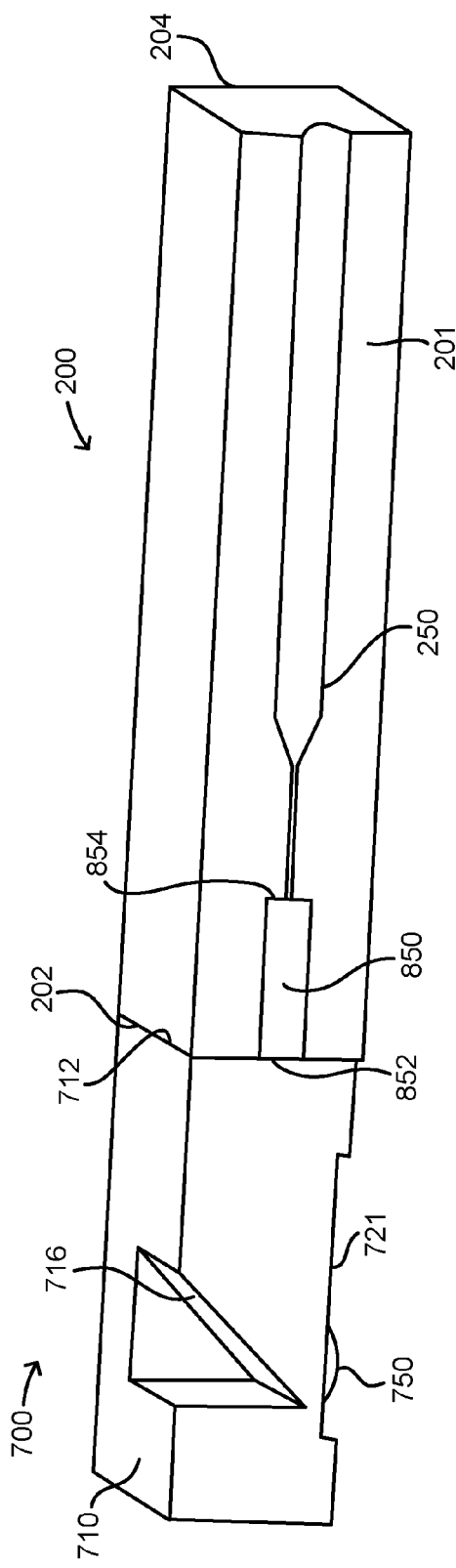
FIG. 10C is a cut-away view of an example ferrule for a fiber optic interface device where the ferrule includes a GRIN lens at the ferrule end, with the ferrule operably engaged with another ferrule that also includes a GRIN lens.
Figure 10D:
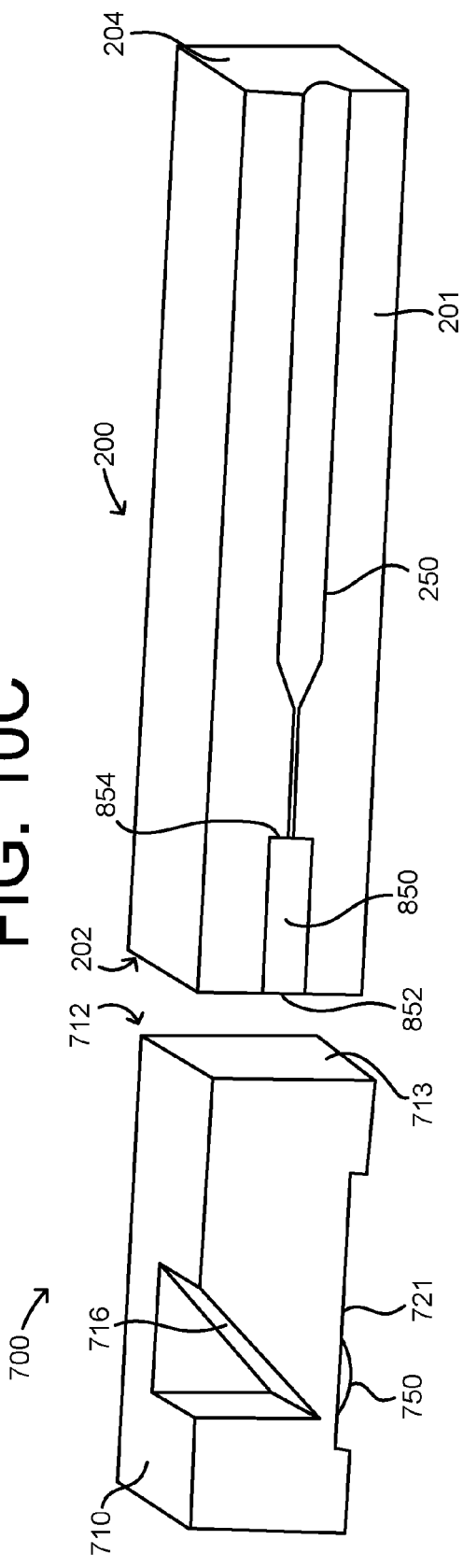
FIG. 10D is similar to FIG. 10B, but with the two ferrules disengaged.

FIG. 10C is a cut-away view of an example plug ferrule 200 that includes a GRIN lens at the plug ferrule end 202, with the plug ferrule operably engaged with a light-transmitting member 710. FIG. 10D is similar to FIG. 10C, but with the plug ferrule 200 and light-transmitting member 710 disengaged.

In an example, the GRIN lenses described herein may be of the type formed by ionic diffusion into glass rods (i.e., an ionic-diffusion process), or may be of the type formed by drawing a pre-form so that it has a select size and refractive index profile, and then forming GRIN rods from the drawn pre-form (i.e., a fiber-drawing process). An example pre-form is an optical fiber preform, such as one used to form gradient-index optical fibers.

Cylindrical Lens Embodiments

Figure 11A:
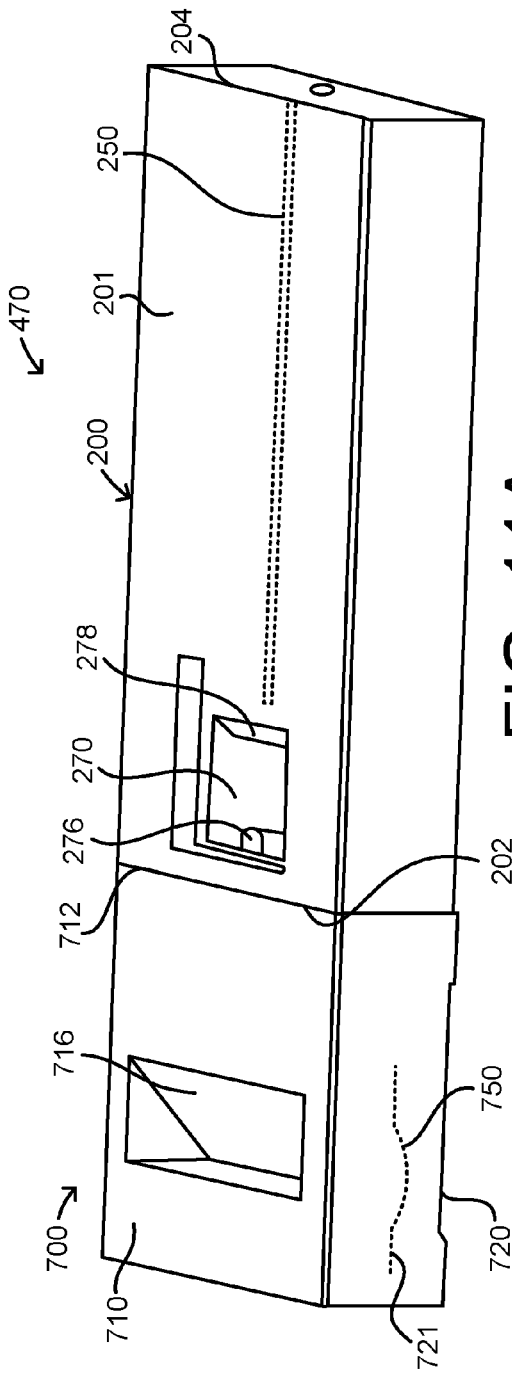
FIG. 11A is a top elevated view of an example ferrule shown operably engaged to an example light-transmitting member, where the ferrule includes crossed cylindrical lenses.
Figure 11B:
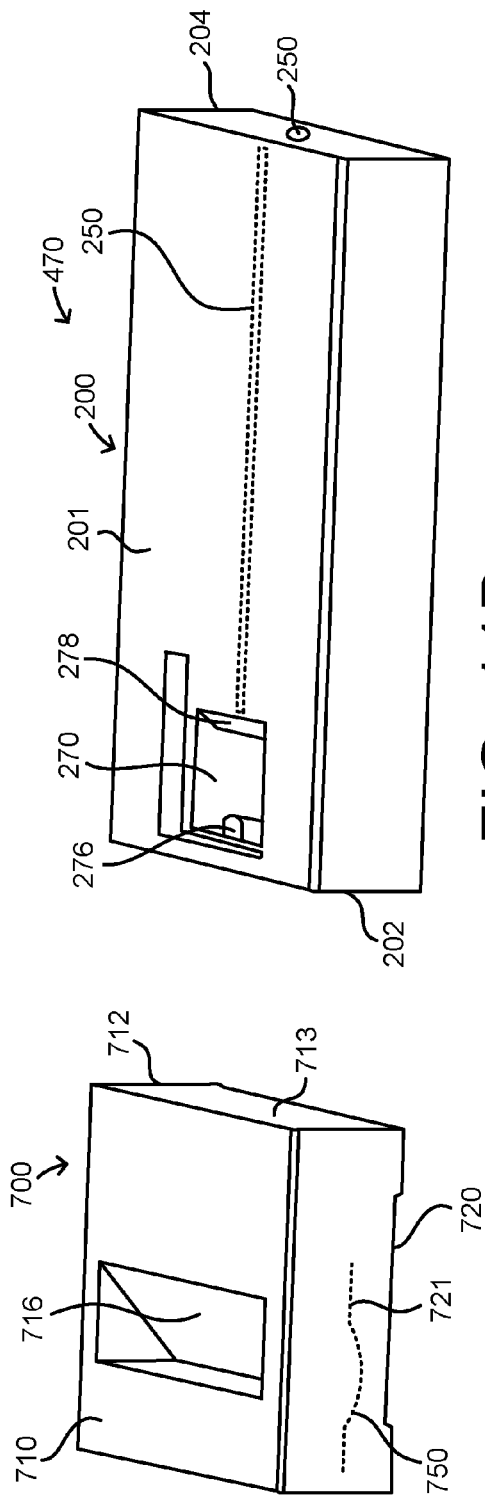
FIG. 11B is a similar view but with the plug ferrule shown disengaged from the light-transmitting member.
Figure 11C:
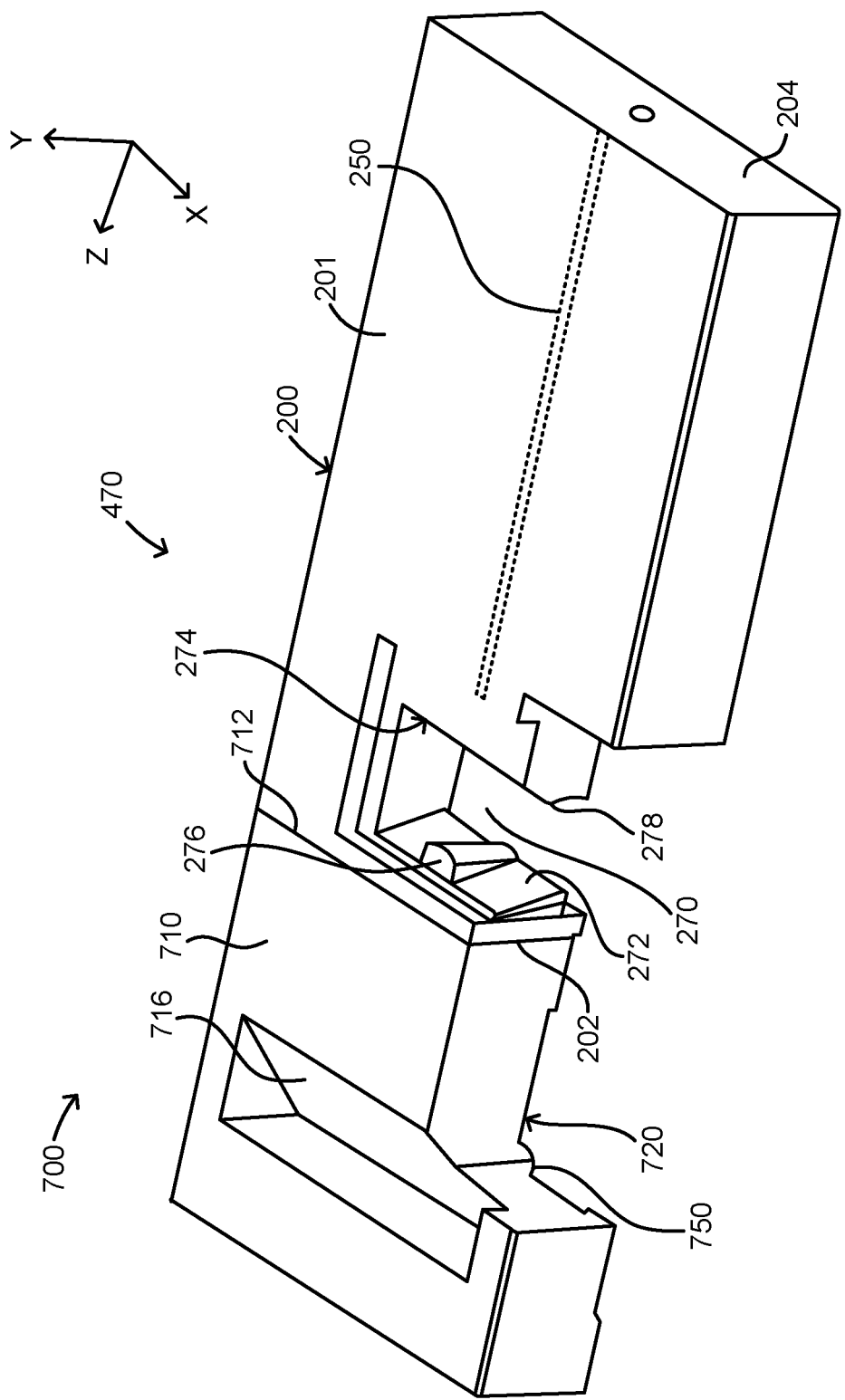
FIG. 11C and FIG. 11D are cut-away views of the mated light-transmitting member and the ferrule of FIGS. 11A and 11B.
Figure 11D:
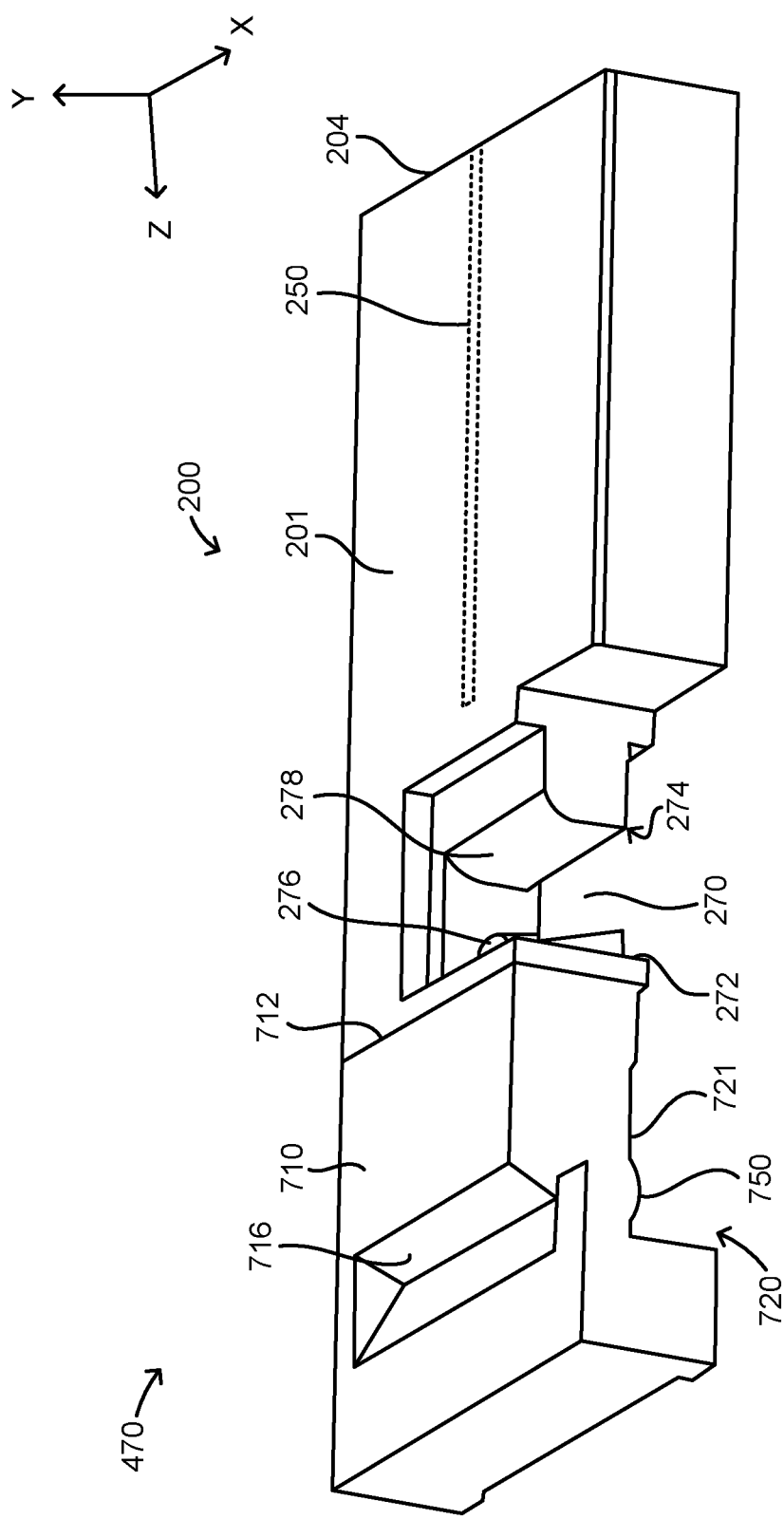

FIG. 11A is a top elevated view of a plug ferrule 200 shown operably engaged to an example light-transmitting member 710 to form an example fiber optic interface assembly 470, while FIG. 11B is a similar view but with plug ferrule 200 shown disengaged from light-transmitting member 710. FIG. 11C and FIG. 11D are cut-away views of the mated light-transmitting member 710 and plug ferrule 200 of FIGS. 11A and 11B. Light-transmitting member 710 is as shown in FIG. 7D, and has a planar front surface 713.

Plug ferrule 200 includes an internal cavity 270 having a front (forward) surface 272 and a rear (rearward) surface 274. Front surface 272 includes a first cylindrical lens 276 with curvature (and thus power) in the X-Z plane, while rear surface 274 includes a second cylindrical lens 278 with curvature (and thus power) in the Y-Z plane. Thus, first and second cylindrical lenses 276 and 278 constitute a pair of crossed cylindrical lenses with powers in orthogonal directions.

FIG. 12A and FIG. 12B are close-up, cross-sectional views of plug ferrule 200 and internal cavity 270, showing the bare optical fiber 616 supported in plug ferrule bore 250. The cross-section of FIG. 12A is taken in the X-Z plane while the cross-section of FIG. 12B taken in the Y-Z plane. The light path of light 650 is shown as dotted lines.

With reference to FIG. 12A, uniformly divergent light 650D from end 618 of bare optical fiber 616 passes through second lens 278 without being refracted in the X-Z plane and reaches first cylindrical lens 276, which refracts divergent light 650F to form substantially collimated light 650C in the X-Z plane. Likewise, with reference to FIG. 12B, diverging light 650D in the Y-Z plan is refracted by second cylindrical lens 278 to form substantially collimated light 650C that passes through first cylindrical lens 276 without being refracted in the Y-Z plane. The result is a substantially collimated but astigmatic light beam 650C', i.e., the light beam has a width in the X-Z plane that is greater than the width in the Y-Z plane. This astigmatic, substantially collimated light 650C' passes through the interfaced planar front ends 202 and 712 of plug ferrule 200 and light-transmitting member 710. This astigmatic substantially collimated light 650C' then reflects from angled surface 716 and proceeds to lens 750, which is has an anamorphic configuration that receives astigmatic substantially collimated light 650C' and forms focused light 650F.

Figure 13A:
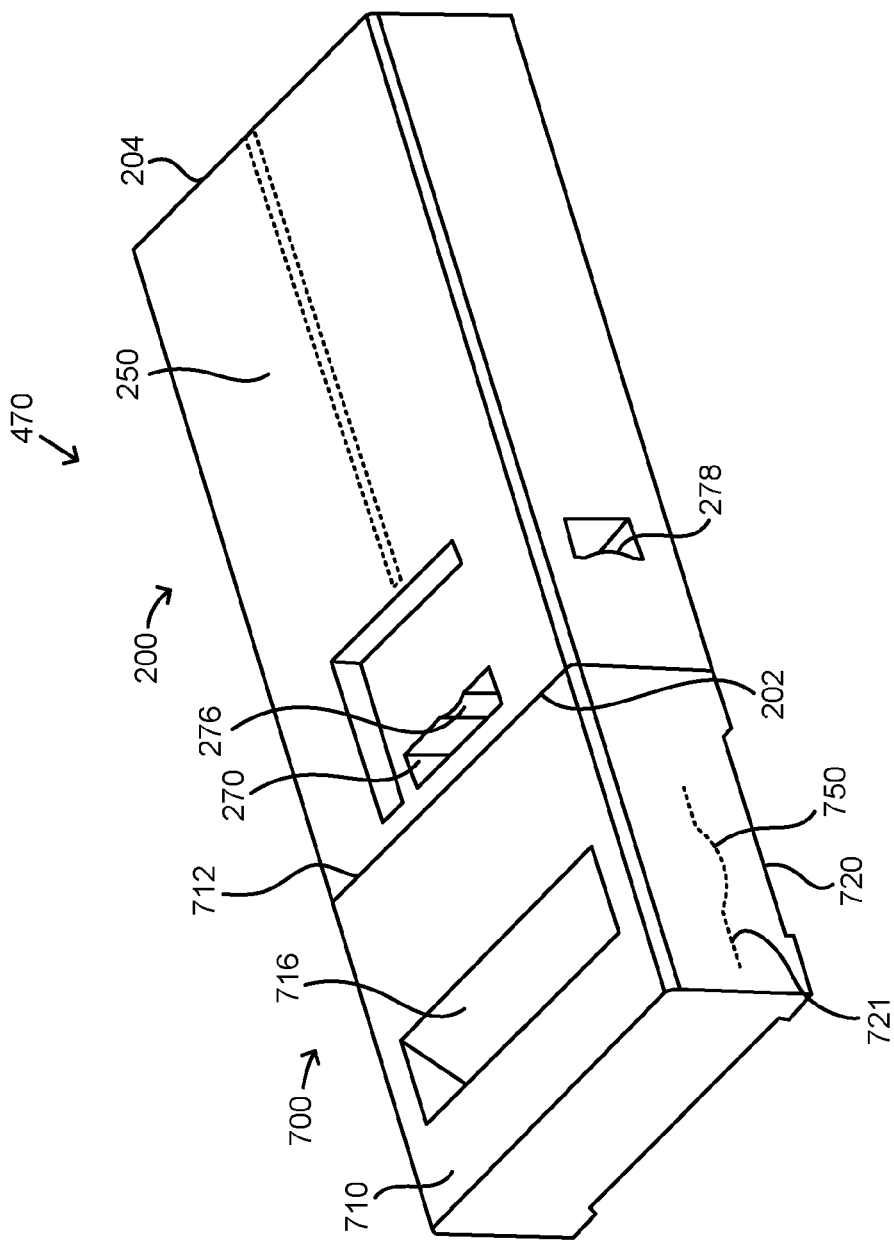
FIG. 13A is a top elevated view of an example ferrule having another example configuration of crossed cylindrical lenses, with the ferrule shown operably engaged with a light-transmitting member.
Figure 13B:
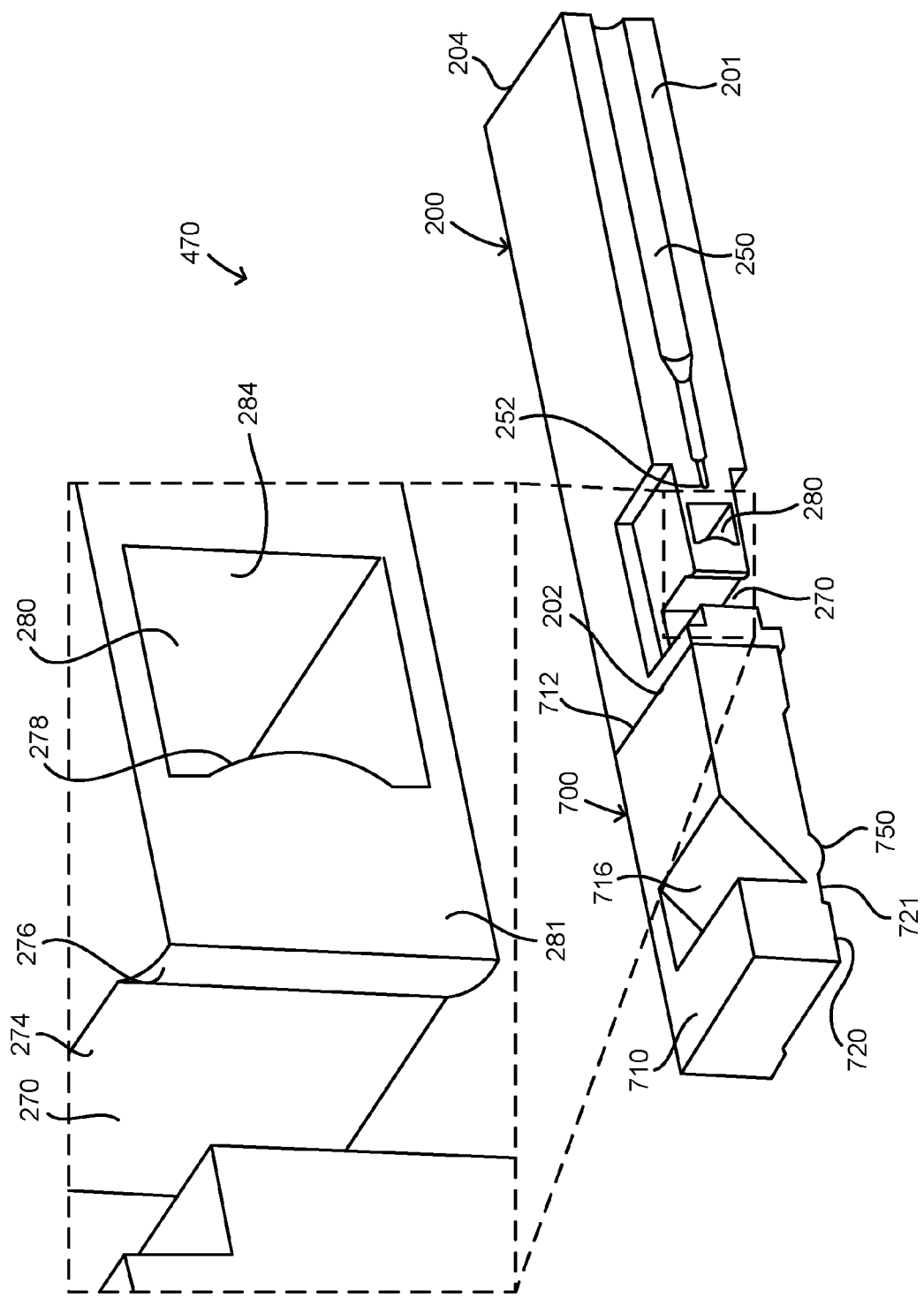
FIG. 13B is a cut-away view of the engaged ferrule and light-transmitting member of FIG. 13A, showing the example configuration of the cross-cylindrical lenses.

FIG. 13A is a top elevated view of an example plug ferrule 200 shown operably engaged with light-transmitting member 710 to form an example fiber optic interface assembly 470. FIG. 13B is a cut-away view of the engaged plug ferrule 200 and light-transmitting member 710, showing an example configuration of the cross-cylindrical lenses 276 and 278 of the plug ferrule. Plug ferrule 200 is similar to that described above in connection with FIGS. 11A through 12B, but includes another cavity 280 adjacent cavity 270 and towards the plug ferrule rear end 204. The two cavities 270 and 280 are separated by a wall 281. Wall 281 includes the aforementioned rear surface 274 of cavity 270 and also includes an opposite surface 282 at the front of second cavity 280. Cavity 280 also includes a rear wall 284.

In this cavity configuration, cylindrical lens 276 is now formed on rear surface 274 of cavity 270 while cylindrical lens 278 is formed on front surface 282 of cavity 280. Thus, the two cylindrical lenses are part of the same wall 281 and can be thought of as constituting a single lens element. The optical path of light 650 is essentially as that described above in connection with FIGS. 11A through 11D and FIGS. 12A and 12B, with light-transmitting member 710 having the aforementioned anamorphic lens 750 at input/output end 720 of light-transmitting member 710 to form focused light 650F.

Uses and Advantages

The optical interface devices, assemblies and components (e.g., plug ferrules, light-transmitting member, etc.) disclosed herein have a number of uses and advantages. By arranging the plug lens to be an internal lens, and therefore by having the external surface of the plug to be a planar surface, the plug ferrule is less susceptible to the adverse effects of contaminants in the form of debris, liquids, etc., because it can be more easily cleaned of contaminants.

In addition, by having the plug ferrule engage the corresponding receptacle light-transmitting member by interfacing respective planar plug and receptacle surfaces, any contaminants that may find their way into the mating interface can be displaced upon mating the plug and receptacle. This is particularly true of liquid contaminants, which are substantially dispelled by interfacing the plug and receptacle planar surfaces. This is an advantage compared to plug and receptacle fiber optic interface devices that use lenses where the external surfaces are curved (i.e. not planar). This is because the presence of a liquid contaminant between two optical surfaces of which at least one is curved can affect the refraction of light on that surface, thus modifying the focal length of the lens and by that recuing the optical coupling efficiency. This is true even if the liquid contaminant is essentially transparent.

By contrast, the presence of a liquid contaminant between two optical planar surfaces does not substantially alter the refraction of light, and the only loss in coupling efficiency is caused by the optical absorption in the liquid contaminant. Such loss caused by optical absorption is anticipated to be acceptably low (typically less than 20%) for common water-based and oil-based contaminants. It is worth noting that in some cases a liquid and substantially transparent contaminant present between two planar optical surfaces may even result in an increase of optical coupling efficiency because the presence of the contaminant can reduce or eliminate the Fresnel reflections, e.g., by serving as an index-matching material.

In an example embodiment, the planar-to-planar interface formed when mating plug 10 and receptacle 700 can be spaced apart by a distance from 0 mm (i.e., in contact) up to 100 microns. A slightly spaced apart configuration for the interface has the advantage that the interfacing surfaces are less subject to being damaged by contaminants being squeezed between the confronting surfaces. Also, the planar surfaces described have been shown as "vertical" surfaces, i.e., with the surfaces at right angles to the central axes of the plug and receptacle. However, in other embodiments, the planar surfaces can have an angle other than 90 degrees relative to the respective central axes of the plug and receptacle. An advantage of bringing the planar surfaces into contact at the planar-to-planar interface is that liquid contaminants can be substantially expelled from the interface. This is referred to herein as a liquid-displacing interface.

An aspect of the disclosure includes a method of transmitting light 650 through a liquid-displacing interface. The method includes supporting in a ferrule 200 of a ferrule assembly 430 an optical fiber 602 having an end 618. The ferrule supports a lens such as lens 500 or GRIN lens 850, operably arranged relative to the optical fiber end. The ferrule assembly 430 has a front end such as formed by endcap front end 402 or by substantially transparent member 800, and this front end defines a first planar front surface. The first planar front surface may include or otherwise be defined by, for example, endcap front surface 403, transparent member front surface 802 or GRIN lens front surface 852. The method also includes interfacing the first planar front surface with a second planar front surface 713 of light-transmitting member 710 to define the liquid-displacing interface. The method further includes transmitting the light 650 through the optical fiber, through the lens and through the liquid-displacing interface and to the light-transmitting member.

In an example, the plug ferrule 200 defines a plug 10 having a small form factor. With reference again to FIG. 4A, in an example, endcap 400 has a diameter d that defines a dimension of plug 10. In an example wherein plug 10 has a small form factor, d is between 2 mm and 4 mm.

It will be apparent to those skilled in the art that various modifications and variations can be made to the present disclosure without departing from the spirit and scope of the disclosure. Thus, it is intended that the present disclosure cover the modifications and variations of this disclosure provided they come within the scope of the appended claims and their equivalents.

What is claimed is:

1. A receptacle assembly for engaging a first fiber optic interface device having a first planar surface and a first lens, said receptacle assembly comprising:
    a light transmitting body with (i) a front section having a front end with a planar surface; (ii) an angled surface; and (iii) a curved optical surface situated to direct light to and to receive light from said angled surface, with said angled surface operably arranged between said curved optical surface and said planar front surface of the front section;
    a receptacle end cap disposed over the front section, the receptacle end cap having a body with a front end defined by a solid transparent endwall having a planar front outer surface that defines a second planar surface, and an opposite inner surface, with the inner surface having a receptacle lens that is spaced apart from and that faces the planar surface of the front section; and
    wherein the first and second planar surfaces defining a liquid-displacing interface configured to pass a substantially collimated light beam that is substantially the same diameter of the receptacle lens when the receptacle assembly and the first fiber optic interface device are engaged.

2. The receptacle assembly of claim 1, wherein said curved optical surface is convex.

3. The receptacle assembly of claim 1, wherein the first fiber optic interface device emits the substantially collimated light beam through the liquid-displacing interface, and said receptacle lens is a convex lens that acts to focus the substantially collimated light beam to form a focused beam that is directed to the angled surface through the planar surface of the front section of the light-transmitting body.

4. The receptacle assembly of claim 1, wherein said curved optical surface is convex and said receptacle lens has a convex surface.

5. The receptacle assembly of claim 1, wherein said receptacle lens has a convex surface integrally formed with the receptacle end cap.

6. The receptacle assembly of claim 5, wherein the curved optical surface defines a first convex lens, the receptacle lens defines a second convex lens and wherein the first convex lens is stronger than the second convex lens.

7. The receptacle assembly of claim 1, wherein said angled surface is a reflective surface.

8. The receptacle assembly of claim 7, wherein said angled surface couples light between said receptacle lens and said curved optical surface via total internal reflection TIR.

9. An optical assembly comprising:
    a) the receptacle assembly of claim 1; and
    b) a ferrule assembly for the first fiber optic interface device, the ferrule assembly comprising:
    a ferrule having a front end, a front section at the front end, and a bore configured to support an optical waveguide, the bore having an end at or adjacent the ferrule front end; wherein the first lens is situated on or adjacent the ferrule front end and-is aligned with the bore and operably arranged relative to the bore end; and wherein the first planar surface is provided on or adjacent the first lens; and
    c) wherein the first and second fiber optic interface devices are engageable such that the first and second planar surfaces are interfaced to define the liquid-displacing interface.

* * * * *